United States Patent
Tanimura et al.

(10) Patent No.: US 10,461,334 B2
(45) Date of Patent: Oct. 29, 2019

(54) GAS DIFFUSION ELECTRODE AND FUEL CELL

(71) Applicant: TORAY INDUSTRIES, INC., Tokyo (JP)

(72) Inventors: Yasuaki Tanimura, Otsu (JP); Masamichi Utsunomiya, Otsu (JP); Michio Wakatabe, Otsu (JP); Toshiya Kamae, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 11 days.

(21) Appl. No.: 15/778,529

(22) PCT Filed: Dec. 16, 2016

(86) PCT No.: PCT/JP2016/087627
§ 371 (c)(1),
(2) Date: May 23, 2018

(87) PCT Pub. No.: WO2017/110693
PCT Pub. Date: Jun. 29, 2017

(65) Prior Publication Data
US 2018/0375106 A1    Dec. 27, 2018

(30) Foreign Application Priority Data

Dec. 24, 2015 (JP) ................................. 2015-251779

(51) Int. Cl.
*H01M 4/86* (2006.01)
*H01M 4/88* (2006.01)
*H01M 4/96* (2006.01)

(52) U.S. Cl.
CPC ....... *H01M 4/8626* (2013.01); *H01M 4/8657* (2013.01); *H01M 4/8807* (2013.01); *H01M 4/8885* (2013.01); *H01M 4/96* (2013.01)

(58) Field of Classification Search
None
See application file for complete search history.

(56) References Cited

U.S. PATENT DOCUMENTS 6,127,059 A    10/2000   Kato
2009/0214918 A1  8/2009   Song et al.
(Continued)

FOREIGN PATENT DOCUMENTS

JP   2000123842 A    4/2000
JP   2002352807 A    12/2002
(Continued)

OTHER PUBLICATIONS

International Search Report and Written Opinion for International Application No. PCT/JP2016/087627, dated Mar. 21, 2017, 5 pages.

*Primary Examiner* — Yoshitoshi Takeuchi
(74) *Attorney, Agent, or Firm* — RatnerPrestia

(57) ABSTRACT

A gas diffusion electrode has a microporous layer on at least one surface of an electroconductive porous substrate. The microporous layer has a first microporous layer in contact with the electroconductive porous substrate, and a dense layer in contact with the first microporous layer. The thickness of the dense layer is at least 1 μm. The average number density B of pores having a pore diameter of 0.15-1 μm in the dense layer is at least 1.3A, where A is the average number density of pores having a pore diameter of 0.15-1 μm in the microporous layer disposed on at least one surface of the electroconductive porous substrate.

11 Claims, 7 Drawing Sheets

(56) References Cited

U.S. PATENT DOCUMENTS

| | | |
|---|---|---|
| 2013/0052450 A1 | 2/2013 | Miyauchi et al. |
| 2013/0337366 A1 | 12/2013 | Blanchet et al. |
| 2014/0272664 A1 | 9/2014 | Lu et al. |

FOREIGN PATENT DOCUMENTS

| | | |
|---|---|---|
| JP | 3382213 B2 | 3/2003 |
| JP | 2006281155 A | 10/2006 |
| JP | 3773325 B2 | 2/2008 |
| JP | 2009076451 A | 4/2009 |
| JP | 2009199988 A | 9/2009 |
| JP | 2010129310 A | 6/2010 |
| JP | 4780814 B2 | 9/2011 |
| JP | 2011246506 A | 12/2011 |
| JP | 2012104408 A | 5/2012 |
| JP | 2015526840 A | 9/2015 |

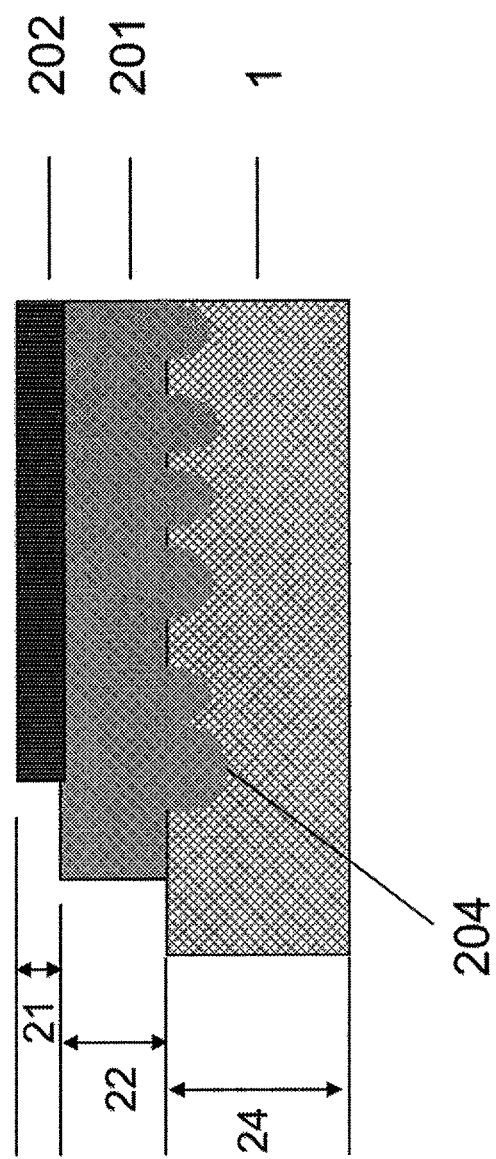
[Fig 1]

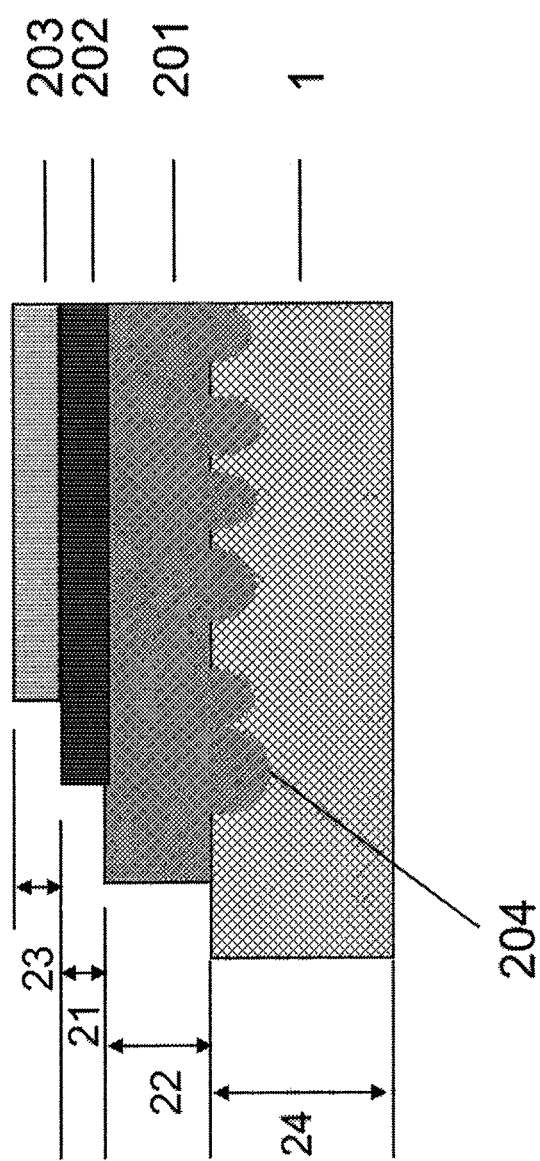
[Fig 2]

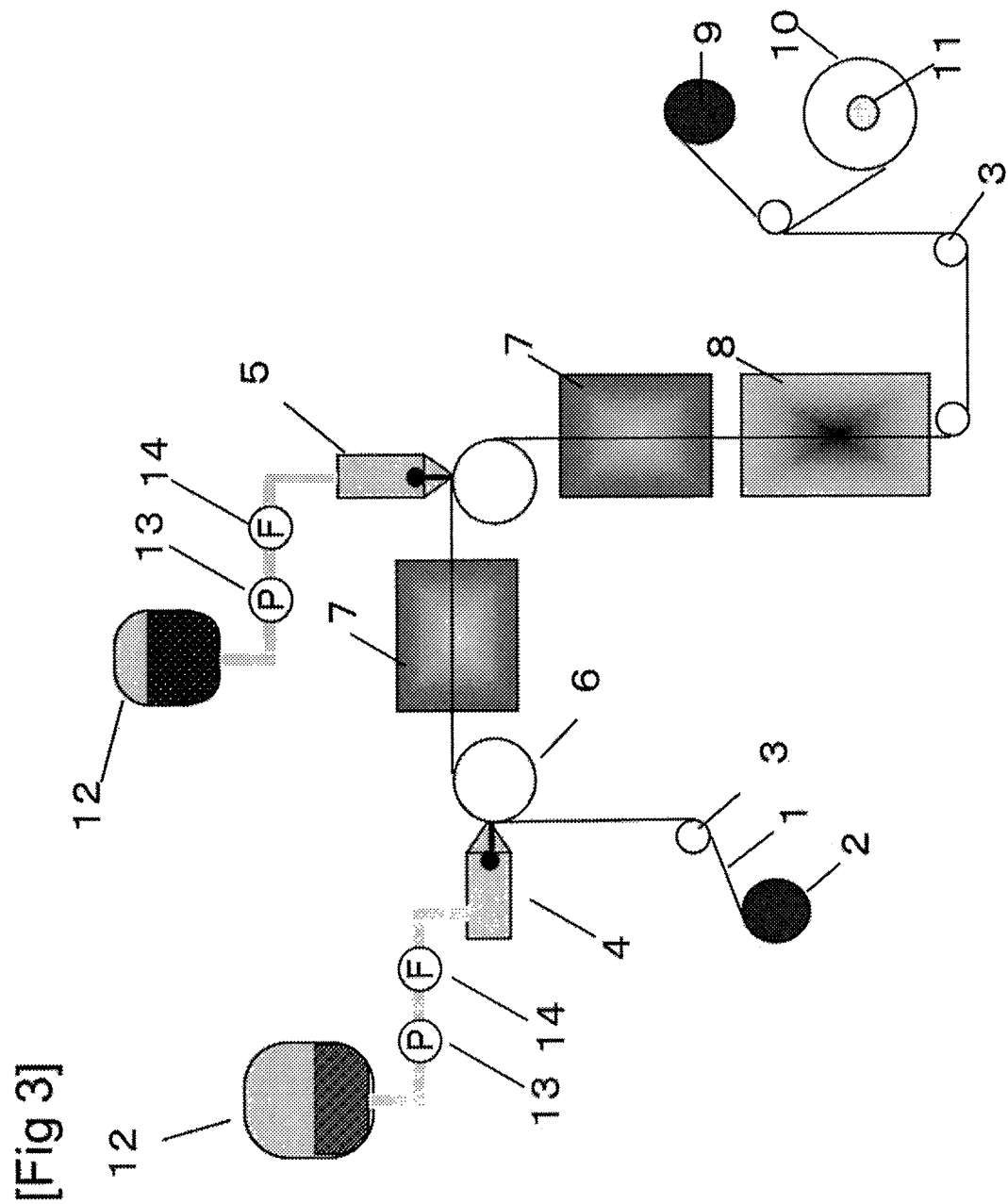

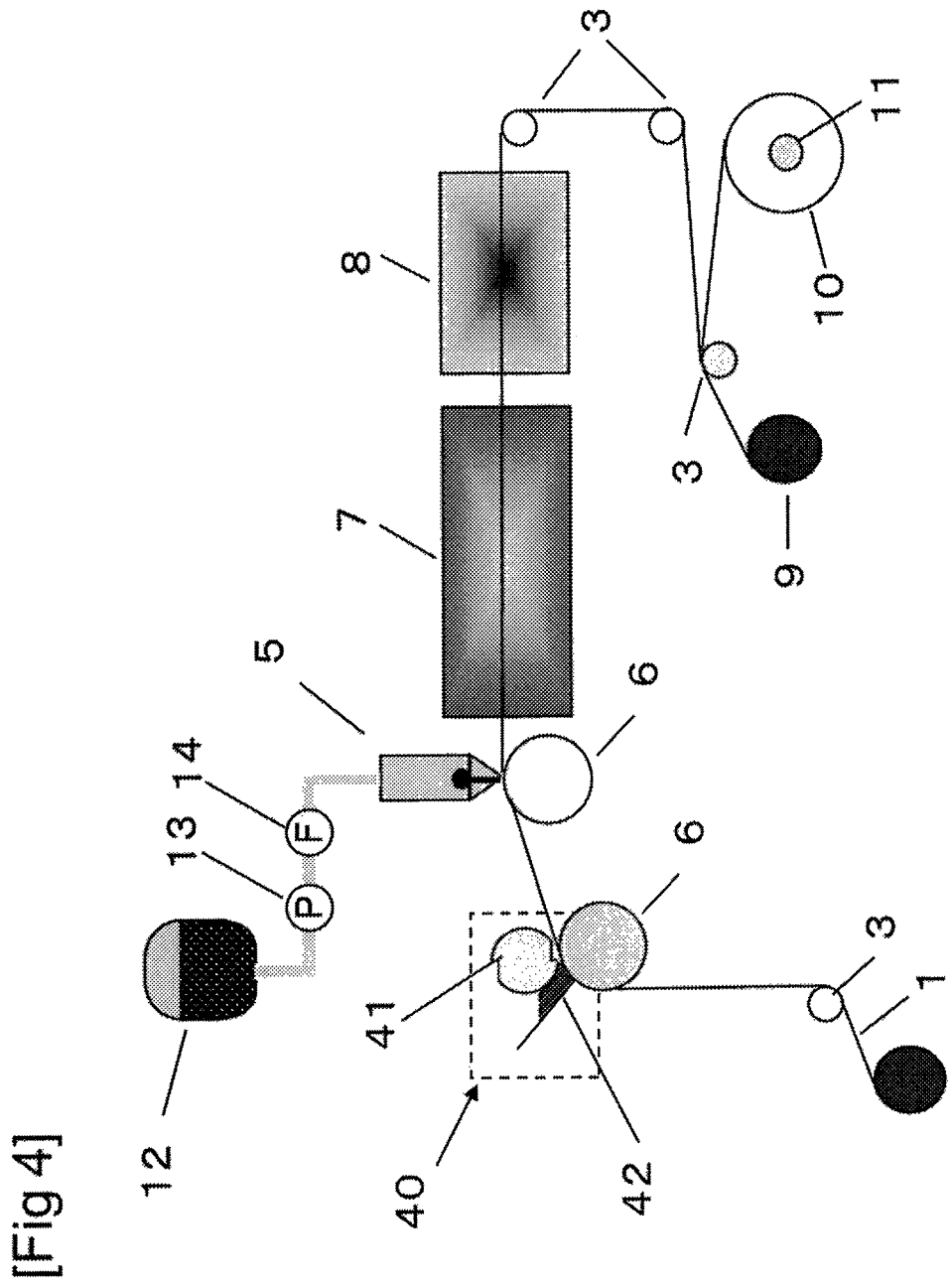
[Fig 4]

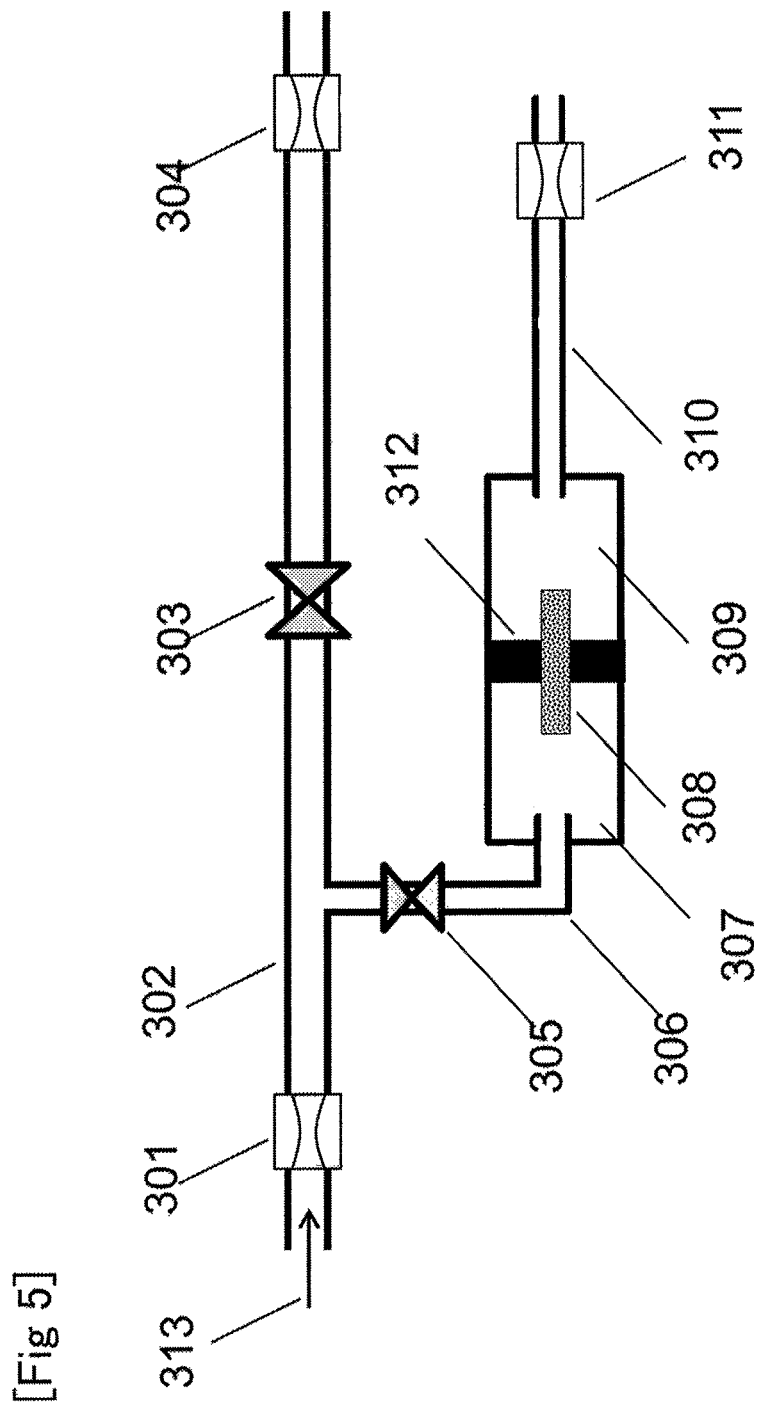
[Fig 5]

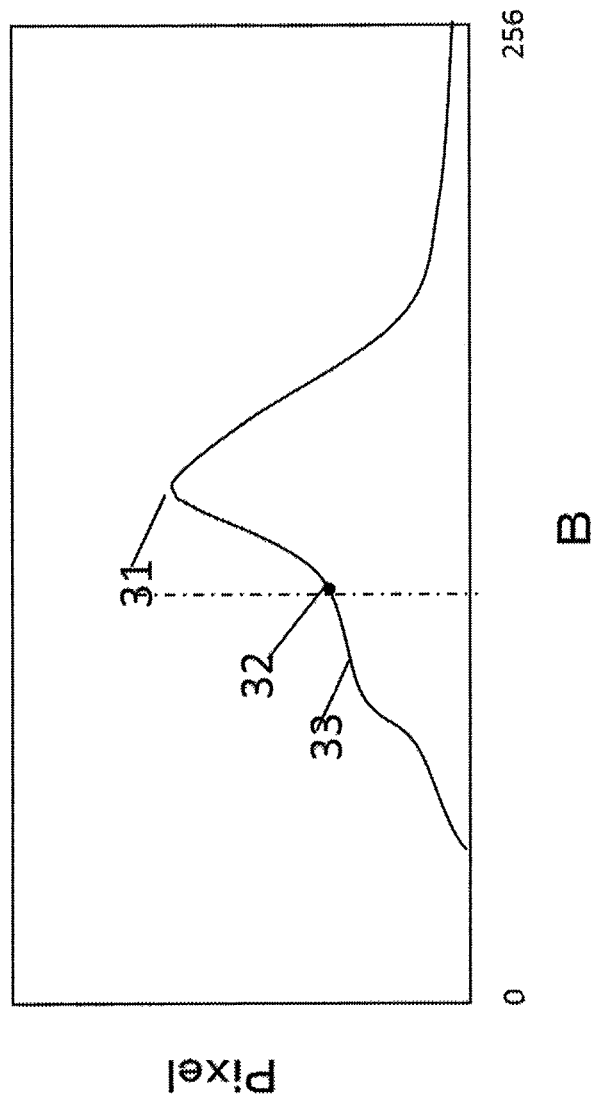
[Fig 6]

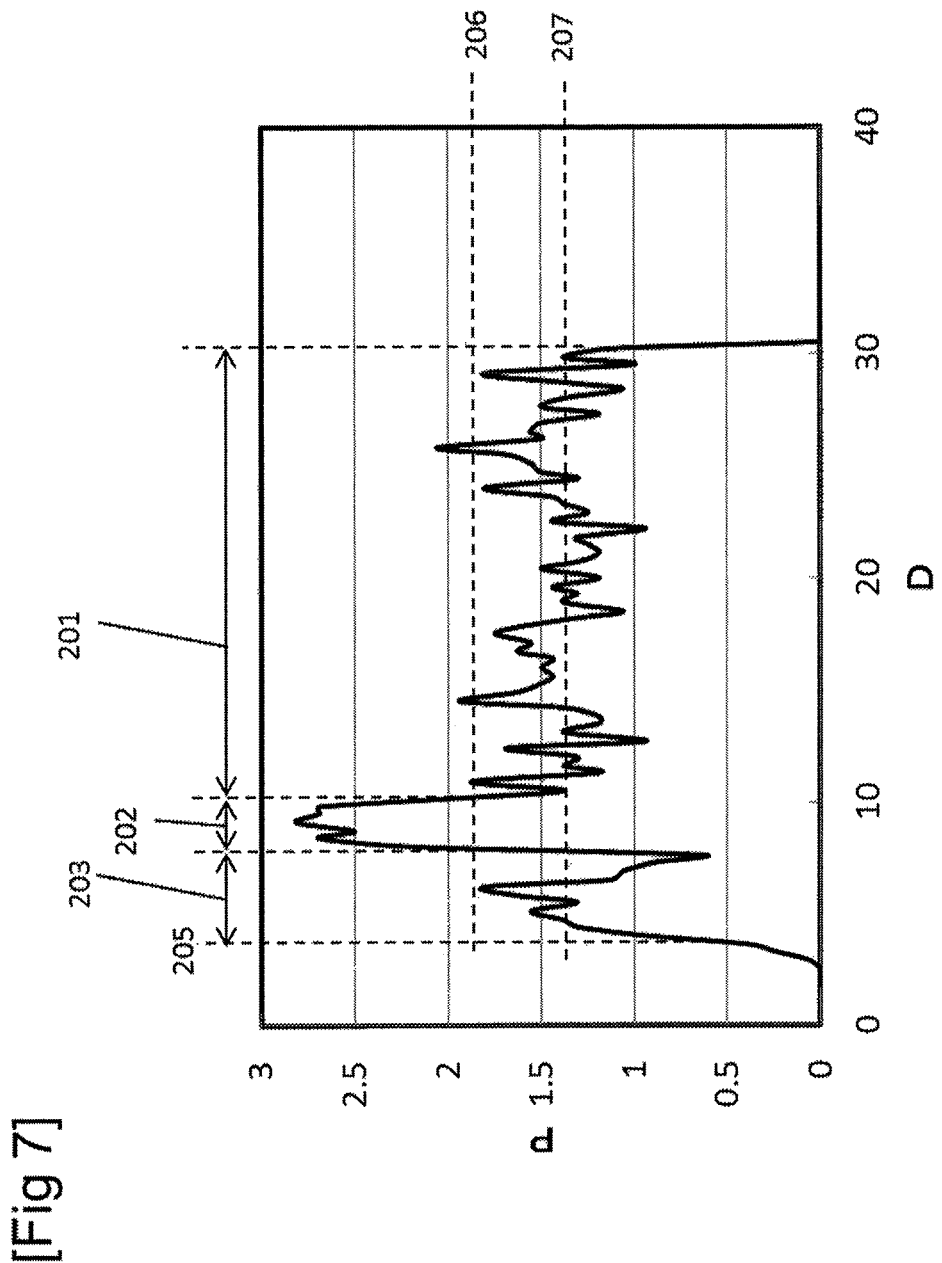
[Fig 7]

GAS DIFFUSION ELECTRODE AND FUEL CELL

CROSS REFERENCE TO RELATED APPLICATIONS

This is the U.S. National Phase application of PCT/JP2016/087627, filed Dec. 16, 2016, which claims priority to Japanese Patent Application No. 2015-251779, filed Dec. 24, 2015, the disclosures of these applications being incorporated herein by reference in their entireties for all purposes.

TECHNICAL FIELD OF THE INVENTION

The present invention relates to a gas diffusion electrode and a fuel cell.

BACKGROUND OF THE INVENTION

A fuel cell is a mechanism in which energy generated in production of water by reaction of hydrogen and oxygen is electrically extracted. Fuel cells are expected to come into wide use as clean energy sources because they have high energy efficiency, and discharge only water. Among them, polymer electrolyte fuel cells are expected to be used as power sources for fuel cell vehicles.

An electrode to be used for a polymer electrolyte fuel cell is disposed so as to be sandwiched between two separators in the polymer electrolyte fuel cell. Such an electrode has a structure in which on both sides of a polymer electrolyte membrane, a catalyst layer is formed on the surface of the polymer electrolyte membrane, and a gas diffusion layer is formed outside the catalyst layer. As an individual member for forming a gas diffusion layer in an electrode, a gas diffusion electrode is circulated. The gas diffusion electrode is required to have performance such as, for example, gas diffusibility, electrical conductivity for collecting electricity generated in the catalyst layer, and water removal performance for efficiently removing water generated on the surface of the catalyst layer. For obtaining such a gas diffusion electrode, an electrically conductive porous substrate having both gas diffusibility and electrical conductivity is generally used.

Specific examples of the electrically conductive porous substrate that is used include carbon felts carbon papers and carbon cloths. Among them, carbon papers are most preferable from the viewpoint of mechanical strength etc.

In addition, the fuel cell is a system in which energy generated at the time when hydrogen and oxygen react with each other to produce water, and therefore when an electrical load increases, i.e. a current to be extracted outside the cell increases, a large amount of water (water vapor) is generated. When at a low temperature, the water vapor is condensed into water droplets, so that pores of the gas diffusion electrode are closed, and the amount of a gas (oxygen or hydrogen) supplied to the catalyst layer decreases. When all the pores are ultimately closed, power generation is stopped (this phenomenon is referred to as flooding).

The gas diffusion electrode is required to have water removal performance so that occurrence of the flooding is inhibited as much as possible. As means for improving the water removal performance, hydrophobicity is normally improved using a gas diffusion electrode substrate with an electrically conductive porous substrate subjected to a hydrophobic treatment.

When an electrically conductive porous substrate subjected to a hydrophobic treatment as described above is used directly as a gas diffusion electrode, condensation of water vapor leads to generation of large water droplets because the substrate has a coarse fiber, and thus flooding easily occurs. Thus, a coating liquid in which electrically conductive fine particles of carbon black etc. are dispersed may be applied, dried and sintered to provide a layer called as a microporous layer on an electrically conductive porous substrate subjected to a hydrophobic treatment. It is known that a fluororesin is added as a hydrophobic agent in the microporous layer for imparting hydrophobicity to the microporous layer (e.g. Patent Documents 1, 2 and 3). As a role of the microporous layer, mention is made of, in addition to that described above, an effect of preventing penetration of the catalyst layer into a coarse gas diffusion electrode substrate (e.g. Patent Document 4), and reducing coarseness of the electrically conductive porous substrate.

As the hydrophobic agent, a fluororesin is suitably used because hydrophobicity is preferably as high as possible. In particular, PTFE (polytetrafluoroethylene), FEP (ethylene tetrafluoride-propylene hexafluoride copolymer) or the like, which gives particularly high hydrophobicity, is preferably used. Such a fluororesin is commercially available normally in the form of a dispersion obtained by dispersing the fluororesin in an aqueous dispersion medium with a surfactant. Aqueous coating is preferable from the viewpoint of reduction of an environmental load.

On the other hand, power generation performance under operation conditions at a high temperature is also required. The electrolyte membrane is easily dried at a high temperature. Thus, the ion conductivity of the electrolyte membrane is reduced, leading to deterioration of power generation performance (this phenomenon is referred to as dry-out).

It is effective to control the distribution of diameters of pores in the gas diffusion electrode for preventing the flooding and dry-out. These techniques are described in, for example, Patent Document 5.

PATENT DOCUMENTS

Patent Document 1: Japanese Patent Publication No. 3382213
Patent Document 2: Japanese Patent Laid-open Publication No. 2002-352807
Patent Document 3: Japanese Patent Laid-open Publication No. 2000-123842
Patent Document 4: Japanese Patent Publication No. 3773325
Patent Document 5: Japanese Patent Publication No. 4780814

SUMMARY OF THE INVENTION

However, it is difficult to attain both flooding resistance and dry-out resistance with the techniques disclosed in Patent Documents 1 to 5. In addition, in applications that require a high power, such as those in which a fuel cell is mounted on a fuel cell vehicle, it is difficult to obtain high performance in a wide temperature range.

An object of the present invention is to provide a gas diffusion electrode having both dry-out resistance and flooding resistance and having excellent power generation performance in a wide temperature range by overcoming the above-mentioned defects of conventional techniques.

The present invention employs the following means for solving the above-mentioned problems. That is, the present invention provides a gas diffusion electrode including a microporous layer on at least one surface of an electrically conductive porous substrate. The microporous layer includes a first microporous layer that is in contact with the electrically conductive porous substrate, and a 'dense layer that is in contact with the first microporous layer. The dense layer has a thickness of 1 µm or more. An average number density B of pores having a pore diameter of 0.15 µm or more and 1 µm or less in the dense layer is 1.3A or more where A is an average number density of pores having a pore diameter of 0.15 µm or more and 1 µm or less in the microporous layer disposed on at least one surface of the electrically conductive porous substrate.

By using a gas diffusion electrode of the present invention, there can be provided a fuel cell having both dry-out resistance and flooding resistance and having excellent power generation performance in a wide temperature range by overcoming the above-mentioned defects of conventional arts.

BRIEF DESCRIPTION OF THE DRAWINGS

FIG. 1 is a schematic view showing a configuration of a gas diffusion electrode of the present invention.

FIG. 2 is a schematic view showing a configuration in which the gas diffusion electrode of the present invention includes a second microporous layer.

FIG. 3 is a schematic arrangement view showing an example of a preferred aspect of an apparatus for producing the gas diffusion electrode of the present invention.

FIG. 4 is a schematic arrangement view showing another example of a preferred aspect of an apparatus for producing the gas diffusion electrode of the present invention.

FIG. 5 is a schematic view of an apparatus for measuring gas diffusibility in an in-plane direction.

FIG. 6 shows one example of a number density distribution of pores having a pore diameter of 0.15 µm or more and 1 µm in the present invention.

FIG. 7 shows one example of a number density distribution of pores having a pore diameter of 0.15 µm or more and 1 µm or less in a thickness direction in the gas diffusion electrode of the present invention.

DETAILED DESCRIPTION OF EMBODIMENTS OF THE INVENTION

A gas diffusion electrode of the present invention includes a microporous layer on at least one surface of an electrically conductive porous substrate. The microporous layer includes a first microporous layer that is in contact with the electrically conductive porous substrate, and a dense layer that is in contact with the first microporous layer, the dense layer having a thickness of 1 µm or more. An average number density B of pores having a pore diameter of 0.15 µm or more and 1 µm or less in the dense layer is 1.3A or more where A is an average number density of pores having a pore diameter of 0.15 µm or more and 1 µm or less in the microporous layer disposed on at least one surface of the electrically conductive porous substrate.

The gas diffusion electrode of the present invention includes a microporous layer on at least one surface of an electrically conductive porous substrate. The microporous layer includes at least a first microporous layer that is in contact with the electrically conductive porous substrate, and a dense layer that is in contact with the first microporous layer.

First, the electrically conductive porous substrate will be described with regard to the gas diffusion electrode of the present invention.

In a solid polymer fuel cell, the gas diffusion electrode is required to have high gas diffusibility for diffusing a gas supplied from a separator to a catalyst layer, high water removal performance for discharging water generated by an electrochemical reaction to the separator, and high electrical conductivity for extracting a generated electric current. Thus, for the gas diffusion electrode, an electrically conductive porous substrate, which is a substrate including a porous material having electrical conductivity, and a pore diameter peak normally in a range of 10 µm or more and 100 µm or less. The pore diameter of the electrically conductive porous substrate, and the distribution thereof can be determined by pore diameter distribution measurement using a mercury porosimeter.

Specific examples of the electrically conductive porous substrate that is preferably used include porous substrates containing a carbon fiber, such as carbon fiber fabrics, carbon fiber papermaking materials, carbon fiber nonwoven fabrics, carbon felts, carbon papers and carbon cloths, and metal porous substrates such as foamed sintered metals, metal meshes and expanded metals. In particular, a porous substrate including a carbon fiber, such as a carbon felt, a carbon paper or a carbon cloth, is preferably used because it is excellent in corrosion resistance, and further, a substrate obtained by binding a carbon fiber papermaking material with a carbide, i.e. a carbon paper is preferably used because it is excellent in property of absorbing a change in dimension of an electrolyte membrane in a thickness direction, i.e. "spring property".

In the present invention, the porosity of the electrically conductive porous substrate is preferably 80% or more, more preferably 85% or more for improving the gas diffusibility of the gas diffusion electrode to enhance the power generation performance of the fuel cell as much as possible. The upper limit of the porosity is preferably 95% or less for easily maintaining the structure of the electrically conductive porous substrate.

For determining the porosity of the electrically conductive porous substrate, a cross-section in a thickness direction is cut out by an ion milling apparatus (Model IM4000 manufactured by Hitachi High-Technologies Corporation or its equivalent apparatus can be used), and observed with a scanning electron microscope (SEM). The porosity can be defined as follows: a void portion and a non-void portion that are each in contact with the cross-section are binarized, and the ratio of the area of the void portion to the total area is determined as a porosity (%). The porosity of the electrically conductive porous substrate may be measured using the electrically conductive porous substrate itself, or using the gas diffusion electrode.

In addition, by reducing the thickness of the electrically conductive porous substrate such as a carbon paper, the gas diffusibility of the gas diffusion electrode can be easily improved. The thickness of the electrically conductive porous substrate such as a carbon paper is preferably 220 µm or less, more preferably 150 µm or less, still more preferably 120 µm or less. On the other hand, normally the thickness of the electrically conductive porous substrate is preferably 70 µm or more for easily maintaining the mechanical strength, and facilitating handling in a production process.

For efficiently producing the gas diffusion electrode using such an electrically conductive porous substrate, it is preferable to continuously form a microporous layer after the electrically conductive porous substrate wound up lengthily is unwound and before the electrically conductive porous substrate is wound up.

In the present invention, an electrically conductive porous substrate subjected to a hydrophobic treatment by adding a fluororesin thereto is suitably used. Preferably, the electrically conductive porous substrate for use in the present invention contains a hydrophobic agent such as a fluororesin because the fluororesin acts as a hydrophobic agent. Examples of the hydrophobic agent contained in the electrically conductive porous substrate, i.e. the fluororesin contained in the electrically conductive porous substrate include PTFE (polytetrafluoroethylene) (e.g. "Teflon" (registered trademark)), FEP (ethylene tetrafluoride-propylene hexafluoride copolymer), PFA (perfluoroalkoxy fluororesin), ETFA (ethylene-ethylene tetrafluoride copolymer), PVDF (polyvinylidene fluoride) and PVF (polyvinyl fluoride), and PTFE or FEP, which exhibits high hydrophobic performance, is preferable.

The amount of the hydrophobic agent is not particularly limited, and the suitable amount of the hydrophobic agent is about 0.1% by mass or more and 20% by mass or less based on 100% by mass of the total of the electrically conductive porous substrate. When the amount of the hydrophobic agent is 0.1% by mass or more, sufficient hydrophobicity is exhibited. When the amount of the hydrophobic agent is 20% by mass or less, pores that form a gas diffusion path or a drainage path can be easily secured while hydrophobicity is exhibited.

As a method for subjecting the electrically conductive porous substrate to a hydrophobic treatment, not only a commonly known treatment technique in which the electrically conductive porous substrate is immersed in a dispersion containing a hydrophobic agent, but also a coating technique in which a hydrophobic agent is applied to the electrically conductive porous substrate by die coating, spray coating or the like is applicable. In addition, processing using a dry process such as sputtering of a fluororesin can also be applied. If necessary, a drying process, and a sintering process may be added after the hydrophobic treatment.

The microporous layer will now be described. In the present invention, a microporous layer is provided on at least one surface of the electrically conductive porous substrate. The microporous layer includes at least a first microporous layer that is in contact with the electrically conductive porous substrate, and a dense layer that is in contact with the first microporous layer.

As a role of the microporous layer, mention is made of, for example, (1) protection of a catalyst as a buffer material against the electrically conductive porous substrate having irregularities, (2) a makeup effect in which a surface of a course electrically conductive porous substrate is prevented from being transferred to the electrolyte membrane, and (3) an effect of preventing condensation of water vapor generated in a cathode. For exhibiting the makeup effect among the above-mentioned effects, it is preferable that the microporous layer has a certain thickness.

In the present invention, the microporous layer includes at least a first microporous layer and a dense layer. The total thickness of the microporous layer is preferably more than 10 µm and 60 µm or less when considering the coarseness of the electrically conductive porous substrate. When the microporous layer includes two layers: a first microporous layer 201 and a dense layer 202 as shown in FIG. 1, the total thickness of the microporous layer is the total of a thickness 22 of the first microporous layer and a thickness 21 of the dense layer. When the microporous layer includes three layers: the first microporous layer 201, the dense layer 202 and a second microporous layer 203 as shown in FIG. 2, the total thickness of the microporous layer is the total of the thickness 22 of the first microporous layer, the thickness 21 of the dense layer and a thickness 23 of the second microporous layer. When the total thickness of the microporous layer is 10 µm or more, the smoothing effect is easily improved. In addition, when the total thickness of the microporous layer is 60 µm or less, the gas diffusibility (permeability) of the gas diffusion electrode itself can be increased, and electric resistance can be reduced, so that high power generation performance can be easily obtained. From the viewpoint of improving gas diffusibility or reducing electric resistance, the total thickness of the microporous layer is preferably 50 µm or less, more preferably 40 µm or less.

As used herein, the total thickness of the microporous layer refers to the total thickness of the microporous layer at one surface of the electrically conductive porous substrate on which the first microporous layer and the dense layer are disposed, and even when the microporous layer is disposed on both surfaces of the electrically conductive porous substrate, the total thickness of the microporous layer refers to the total thickness of the microporous layer at only one surface of the electrically conductive porous substrate on which the first microporous layer and the dense layer are disposed.

In addition, when there is an infiltration 204 of the microporous layer into the electrically conductive porous substrate as shown in FIG. 1, the infiltration portion is also included in a thickness 24 of the electrically conductive porous substrate.

The thickness of the gas diffusion electrode or the electrically conductive porous substrate can be measured using a micrometer etc. while a load of 0.15 MPa is applied to the substrate. The thickness of the microporous layer can be measured in the following manner: a cross-section in a thickness direction is cut out by an ion milling apparatus (Model IM4000 manufactured by Hitachi High-Technologies Corporation or its equivalent apparatus can be used), and the thickness is determined.

In the present invention, a region in which the average number density of pores having a pore diameter of 0.15 µm or more and 1 µm or less is 1.3A or more where A is an average number density of pores having a pore diameter of 0.15 µm or more and 1 µm or less in the microporous layer, and the thickness is 1 µm or more is defined as a dense layer. When the pore diameter is 0.15 µm or more, gas diffusibility can be improved, and when the pore diameter is 1 µm or less, retention of water can be suppressed to improve water removal performance. Thus, when a dense layer containing a large number of pores having a pore diameter in the above-mentioned range is present, gas diffusibility and water removal performance can be easily attained, and further, the electrolyte polymer contained in the catalyst layer can be easily inhibited from being diffused to the entire microporous layer at the time when the electrolyte membrane with a catalyst layer and the gas diffusion electrode are laminated and heat-welded, so that the performance of the catalyst layer can be easily maintained. Therefore, high power generation performance can be easily obtained. For obtaining the above-mentioned effect more reliably, the average number density B of pores having a pore diameter of 0.15 µm or more and 1 µm or less in the dense layer is preferably 1.5/µm$^2$ or more, more preferably 2.0/µm$^2$ or more. On the other hand, for smoothly removing water from the dense layer to the first microporous layer, and making it easy for water to move in the first microporous layer, the first microporous layer is preferably non-dense with respect to the dense layer, and the average number density of pores having a pore diameter of 0.15 μM or more and 1 μm or less in the first microporous layer is preferably 2/μm² or less, more preferably 1.5/μm² or less. On the other hand, for easily securing gas diffusibility, the average number density is preferably 0.5/μm² or more, more preferably 1/μm² or more. Further, for efficiently removing water due to presence of large pores in the first microporous layer, the average number density of pores having a pore diameter of 1 μm or more is preferably 0.05/μm² or more, more preferably 0.1/μm² or more.

A method for determining the pore diameter and the number density thereof will now be described. First, a gas diffusion electrode including an electrically conductive porous substrate, and at least a first microporous layer and a dense layer is cut in a thickness direction using an ion milling apparatus such as IM4000 manufactured by Hitachi High-Technologies Corporation, and the resulting cross-section in the thickness direction is observed with a scanning electron microscope (SEM). Next, the resulting SEM image of the cross-section is binarized to extract pores, and a pore having an area equal to or more than the area of a circle with a diameter of 0.15 μm is defined as a pore having a pore diameter of 0.15 μm or more. A pore having an area equal to or less than the area of a circle with a diameter of 1 μm is defined as a pore having a pore diameter of 1 μm or less. The number of pores having a diameter falling within the above-mentioned range is counted, the position of each of the pores is measured in terms of a distance from the surface of the microporous layer in a thickness direction, and the number of the pores is divided by the cross-sectional area of the microporous layer within the SEM image of the cross-section to obtain the average number density A of pores having a pore diameter of 0.15 μm or more and 1 μm or less in the entire microporous layer. In addition, the average number density of pores having a pore diameter of 0.15 μm or more and 1 μm or less is determined every 0.5 μm in the microporous layer in a thickness direction using the resulting positions of pores, and a region having an average number density equal to or more than 1.3 times the average number density A, and a thickness of 1 μm or more is defined as a dense layer.

For suppressing diffusion of the electrolyte polymer of the catalyst layer, the thickness of the dense layer is preferably 1 μm or more, more preferably 2 μm or more, still more preferably 3 μm or more. On the other hand, for improving water removal performance and gas diffusibility, the thickness of the dense layer is preferably 10 μm or less, more preferably 8 μm or less, still more preferably 6 μm or less.

The microporous layer is not particularly limited as long as it includes at least two layers: a first microporous layer that is in contact with the electrically conductive porous substrate and a dense layer that is in contact with the first microporous layer, and the microporous layer may include on the surface thereof a second microporous layer that is in contact with the dense layer.

In the gas diffusion electrode of the present invention, it is preferable that the microporous layer includes a second microporous layer that is in contact with the surface of the dense layer. That is, the gas diffusion electrode of the present invention may include the second microporous layer that is situated on a surface side opposite to the first microporous layer while being in contact with the dense layer. When the microporous layer includes the second microporous layer, a uniform pressure is applied under a buffering action at the time when the electrolyte membrane with a catalyst layer and the gas diffusion electrode are laminated and heat-welded, so that adhesive strength can be increased.

In the gas diffusion electrode of the present invention, the average number density B of pores having a pore diameter of 0.15 μm or more and 1 μm or less is preferably 1.3C or more where C is an average number density of pores having a pore diameter of 0.15 μm or more and 1 μm or less in the second microporous layer. When the second microporous layer has pores larger than those in the dense layer, a small amount of the electrolyte polymer contained in the catalyst layer is diffused to the second microporous layer at the time when the electrolyte membrane with a catalyst layer and the gas diffusion electrode are laminated and heat-welded, so that excellent adhesion can be attained between the microporous layer and the catalyst layer.

On the other hand, a large amount of the electrolyte polymer diffused reduces a reaction in the catalyst, and for suppressing diffusion of a large amount of the electrolyte polymer, the thickness of the second microporous layer is preferably 10 μm or less, more preferably 8 μm or less, still more preferably 6 μm or less. In addition, when the thickness of the second microporous layer is 1 μm or more, a uniform pressure is applied at the time when the electrolyte membrane with a catalyst layer and the gas diffusion electrode are laminated and heat-welded, so that adhesive strength can be increased.

In the gas diffusion electrode of the present invention, it is preferable that the dense layer has a thickness of 1 μm or more and 10 μm or less, and the second microporous layer has a thickness of 1 μm or more and 10 μm or less. When the thickness of the dense layer and the thickness of the second microporous layer are each in the above-mentioned range, diffusion of a gas is facilitated while diffusion of a large amount of the electrolyte polymer is suppressed. In addition, excellent gas diffusibility and water removal performance are easily secured.

In the present invention, a portion of the microporous layer which is closer to the electrically conductive porous substrate than the dense layer is the first microporous layer. For exhibiting the makeup effect on coarseness of the electrically conductive porous substrate, the thickness of the first microporous layer is preferably such that the total thickness of the microporous layer is more than 10 μm as described above. More preferably, the thickness of the first microporous layer alone is 10 μm or more. However, since it is necessary that gas diffusibility be easily secured even with the microporous layer laminated on the electrically conductive porous substrate, the thickness of the first microporous layer is preferably less than 50 μm.

The primary particle diameter of electrically conductive fine particles to be used in the first microporous layer is preferably equal to or more than the primary particle diameter of electrically conductive fine particles to be used in the second microporous layer. This is because the dense layer can be made denser. The primary particle diameter of electrically conductive fine particles contained in the first microporous layer is preferably in a range of 0.040 μm or more and 0.060 μm or less, more preferably in a range of 0.045 μm or more and 0.060 μm or less. The primary particle diameter of electrically conductive fine particles contained in the second microporous layer is preferably in a range of 0.015 μm or more and 0.040 μm or less, more preferably in a range of 0.020 μm or more and 0.037 μm or less. In the gas diffusion electrode of the present invention, it is still more preferable that the first microporous layer contains electrically conductive fine particles having a primary particle diameter of 0.040 µm or more and 0.060 µm or less, and the second microporous layer contains electrically conductive fine particles having a primary particle diameter of 0.015 µm or more and 0.040 µm or less.

In particular, it is preferable that the dense layer has a structure in which electrically conductive fine particles different in primary particle diameter, secondary particle diameter and structure index as described below are mixed for performing control to ensure that the average number density of pores having a pore diameter of 0.15 µm or more and 1 µm or less is 1.3A or more, and a method for forming a dense layer with the dense layer made dense by mixing electrically conductive fine particles for the first microporous layer and for the second microporous layer during coating is preferable because the method has a cost reducing effect by reduction of the number of processes. Here, in the gas diffusion electrode of the present invention, it is preferable that the dense layer contains electrically conductive fine particles having a primary particle diameter of 0.040 µm or more and 0.060 µm or less, and electrically conductive fine particles having a primary particle diameter of 0.015 µm or more and 0.040 µm or less.

The microporous layer is a layer containing electrically conductive fine particles of carbon black, carbon nanotube, carbon nanofiber, chopped carbon fiber, graphene, graphite or the like. For electrically conductive fine particles, carbon black is suitably used from the viewpoint of a low cost, safety, and product quality and stability. In the present invention, it is preferable that the dense layer, the first microporous layer and the second microporous layer each contain carbon black. As carbon black contained in the dense layer, the first microporous layer and the second microporous layer, acetylene black is suitably used because it has a primary particle diameter of 0.1 µm or less, and is thus suitable in the present invention, and the content of impurities is low, so that the activity of a catalyst is hardly reduced. As an index of the content of impurities in carbon black, mention is made of an ash content, and it is preferable to use carbon black having an ash content of 0.1% by mass or less. The ash content of carbon black is preferably as small as possible, and carbon black having an ash content of 0% by mass, i.e. carbon black which does not contain ash, is especially preferable.

The microporous layer is required to have properties such as electrical conductivity, gas diffusibility, water removal performance, moisture retainability and thermal conductivity, and strong acid resistance on the anode side and oxidation resistance on the cathode side in a fuel cell. Thus, it is preferable that the microporous layer contains a hydrophobic agent such as a fluororesin in addition to electrically conductive fine particles.

In the gas diffusion electrode of the present invention, it is preferable that the microporous layer contains a hydrophobic agent, and the hydrophobic agent has a melting point of 200° C. or higher and 320° C. or lower. When the hydrophobic agent has a melting point of 200° C. or higher and 320° C. or lower, the melt viscosity during sintering is reduced to wet and spread the hydrophobic agent in the microporous layer, so that the microporous layer can be made heterogeneously hydrophobic. Further, by reducing the melt viscosity, the sintering temperature can be suppressed, so that costs can be reduced. Examples of the fluororesin contained in the microporous layer include PTFE, FEP, PFA and ETFA as in the case of a fluororesin that is suitably used at the time when the electrically conductive porous substrate is made hydrophobic. The fluororesin is preferably PTFE, FEP or PFA because it has particularly high hydrophobicity. FEP or PFA is preferable as a hydrophobic resin that further reduces the melting point.

In the gas diffusion electrode of the present invention, the content of the hydrophobic agent contained in the microporous layer is preferably 10% by mass or more and 50% by mass or less where the amount of the entire microporous layer is 100% by mass. When the content of the hydrophobic agent is in the above-mentioned range, excellent hydrophobicity can be obtained. Particularly when the content of the hydrophobic agent is 50% by mass or less, it is possible to form pores in the microporous layer and reduce electric resistance. It is known that the hydrophobic agent is thermally decomposed at 400° C. or higher, and eliminated at 500° C. Thus, the content of the hydrophobic agent contained in the microporous layer can be measured on the assumption that a weight loss in heating of the microporous layer to 500° C. in the air is the amount of the hydrophobic agent.

For the gas diffusion electrode to have a microporous layer, a coating liquid for forming a microporous layer, i.e. a microporous layer forming liquid (hereinafter, referred to as a microporous layer coating liquid), is generally applied to the electrically conductive porous substrate. The microporous layer coating liquid normally contains the electrically conductive fine particles, and a dispersion medium such as water or alcohol. A surfactant or the like is often blended as a dispersant for dispersing electrically conductive fine particles. When the hydrophobic agent is included in the microporous layer, it is preferable to include the hydrophobic agent in the microporous layer coating liquid beforehand.

As a method for forming a microporous layer on the electrically conductive porous substrate, a method is also known in which the microporous layer coating liquid is applied onto a substrate such as a PET film, the microporous layer surface thereof is press-bonded onto the electrically conductive porous substrate, and the substrate film is peeled off. However, in the transfer method, the production process is complicated, and it may be unable to obtain sufficient adhesion between the electrically conductive porous substrate and the microporous layer. Thus, as a method for forming a microporous layer, a method in which the microporous layer coating liquid is applied to the electrically conductive porous substrate is preferable. Details of the method will be described below.

The concentration of electrically conductive fine particles in the microporous layer coating liquid is preferably 5% by mass or more, more preferably 10% by mass or more from the viewpoint of productivity. There is not an upper limit on the concentration as long as the viscosity, the dispersion stability of electrically conductive fine particles, the coatability of the coating liquid, and the like are suitable, but practically, when the concentration of electrically conductive fine particles in the microporous layer coating liquid is 50% by mass or less, the coatability of the coating liquid can be secured. When acetylene black is used for electrically conductive fine particles, it has been found from studies by the present inventors that by setting the concentration of acetylene black in the microporous layer coating liquid to 25% by mass or less when the coating liquid is an aqueous coating liquid, reaggregation of acetylene black is prevented to inhibit so called percolation, and thus the microporous layer coating liquid has a stable viscosity, so that the coatability of the coating liquid can be secured. Further, by adding a dispersant and a thickener to the microporous layer coating liquid, the dispersion stability of electrically conductive fine particles and the coatability of the coating liquid can be obtained.

The microporous layer coating liquid can be applied to the electrically conductive porous substrate using a variety of commercially available coating apparatuses. As a coating system, screen printing, rotary screen printing, spraying, intaglio printing, gravure printing, coating with a die coater, coating with a bar coater, coating with a blade coater, coating with a roll knife coater or the like can be employed, but coating with a die coater is preferable because the coating amount can be quantified irrespective of the surface roughness of the electrically conductive porous substrate. In addition, in the case where the smoothness of the coating surface is required for improving adhesion to the catalyst layer when the gas diffusion electrode is incorporated in the fuel cell, coating with a blade coater or a roll knife coater is suitably employed. The coating methods shown above are illustrative only, and the present invention is not necessarily limited thereto.

After the microporous layer coating liquid is applied, the dispersion medium (water in the case of an aqueous system) of the microporous layer coating liquid is removed by drying if necessary. When the dispersion medium is water, the drying temperature after coating is preferably from room temperature (around 20° C.) to 150° C. (inclusive), more preferably 60° C. or higher and 120° C. or lower. Drying of the dispersion medium (e.g. water) may be performed at a time in a subsequent sintering process.

After the microporous layer coating liquid is applied, sintering is generally performed for the purpose of removing a surfactant used in the microporous layer coating liquid, and binding electrically conductive fine particles by dissolving the hydrophobic agent once. Depending on the boiling point or decomposition temperature of a surfactant added, the sintering temperature is preferably 250° C. or higher and 400° C. or lower. When the sintering temperature is lower than 250° C., the surfactant cannot be sufficiently removed, or it takes much time to fully remove the surfactant, and when the sintering temperature is higher than 400° C., the hydrophobic agent may be decomposed.

From the viewpoint of productivity, the sintering time is preferably as short as possible, preferably 20 minutes or less, more preferably 10 minutes or less, still more preferably 5 minutes or less, but when the sintering time is excessively short, vapor and decomposition products of the surfactant are rapidly generated, so that there arises the risk of catching fire when sintering is performed in the air.

As the sintering temperature and time, an optimum temperature and time are selected in view of the melting point or decomposition temperature of the hydrophobic agent and the decomposition temperature of the surfactant. Drying may be performed after each of application of the first microporous layer coating liquid and application of the surface microporous layer coating liquid. Preferably, sintering is performed at a time after application of the first microporous layer coating liquid and application and drying of the surface microporous layer coating liquid. Accordingly, when the surface microporous layer coating liquid is applied onto the first microporous layer before sintering in formation of the dense layer, electrically conductive particles in the first microporous layer can form a mixture with electrically conductive fine particles in the surface microporous layer coating liquid because the electrically conductive particles in the first microporous layer are unbound. Thus, a favorable dense layer can be formed.

The microporous layer coating liquid is applied onto the electrically conductive porous substrate to form the microporous layer, and therefore as shown in FIGS. 1 and 2, the coating liquid may infiltrate into holes of the electrically conductive porous substrate, leading to formation of an infiltration 204 of the microporous layer into the electrically conductive porous substrate. Thus, the thickness of each microporous layer in the present invention is evaluated with a thickness of only a portion which does not include the infiltration portion and which is present outside the electrically conductive porous substrate.

The dense layer 202 and the second microporous layer 203 in the present invention are formed by applying a coating liquid for forming the microporous layer to a surface that is outside the first microporous layer when seen from the electrically conductive porous substrate side (hereinafter, the liquid is referred to as a surface microporous layer coating liquid). When the microporous layer includes only two layers: the first microporous layer and the dense layer, the surface microporous layer coating liquid is applied to the surface of the first microporous layer, and the surface microporous layer coating liquid forms a mixed layer with the first microporous layer, so that the dense layer is formed on the surface. By further applying a large amount of the surface microporous layer coating liquid, the second microporous layer can be formed on the surface of the dense layer.

By controlling the pore diameter of the first microporous layer that is in contact with the dense layer, water removal performance from the dense layer having a small pore diameter to the first microporous layer having a large pore diameter can be improved. The pore diameter of the first microporous layer can be controlled by selecting the type of electrically conductive fine particles to be blended in the first microporous layer coating liquid, adjusting the dispersion degree, or appropriately selecting the particle diameter and shape of electrically conductive fine particles. For electrically conductive fine particles, carbon black is preferably used because it is inexpensive, and thus easily available, and has high reliability of safety. For the gas diffusion electrode of the present invention to have excellent gas diffusibility, it is preferable that carbon black particles to be used in the first microporous layer form an aggregate (a so called structure), and the carbon black has a two-dimensionally or three-dimensionally linked structure. Accordingly, continuous voids can be formed to serve as a water removal path in the first microporous layer that is in contact with the dense layer, so that water can be smoothly removed from the dense layer. For this purpose, it is preferable that the carbon black in the first microporous layer has a structure index of 3.0 or more.

Here, the structure index is one obtained by dividing the value of a DBP oil absorption (cc/100 g) by the value of a BET specific surface area ($m^2$/g) of carbon black. When the value of the structure index increases, the branched structure of aggregation of carbon black is expanded, so that large holes are easily formed in the coating film. However, when the structure index is excessively large, cracks are generated between aggregates of carbon black, and therefore the upper limit of the structure index of carbon black in the first microporous layer is preferably about 4.5.

The gas diffusion electrode of the present invention improves power generation performance at a high temperature. For improving power generation performance at a low temperature of 40° C. or lower as well, it is preferable that the gas diffusion electrode of the present invention has a gas diffusibility of 30% or more in a thickness direction. The gas diffusibility in the thickness direction is more preferably 32% or more. The gas diffusibility in the thickness direction is preferably as high as possible. On the other hand, in incorporation of the gas diffusion electrode in a fuel cell, there is an upper limit on the pore volume for maintaining the structure thereof when a pressure is applied to the inside of the cell, and the gas diffusibility in the thickness direction here may be about 40%.

Similarly, for improving power generation performance at a low temperature of 40° C. or lower as well, it is preferable that the gas diffusion electrode of the present invention has a gas diffusibility of 25 cc/minute or more in an in-plane direction. The gas diffusibility in the in-plane direction is more preferably 50 cc/minute or more. As described below, the gas diffusibility in the in-plane direction is measured at a pressure difference of 5 kPa as a basic measurement condition using the gas diffusion electrode. However, it is not possible to measure the gas diffusibility above 190 cc/minute as a limit in measurement. The practical upper limit value is about 190 cc/minute at a pressure difference of 3 kPa, and if the permeability exceeds this value, the thickness of the gas diffusion electrode is so large that the gas diffusibility in the thickness direction is reduced, or the porosity is so high that when the gas diffusion electrode is incorporated as a gas diffusion layer in a fuel cell, it is difficult to maintain the structure thereof as a gas diffusion layer.

In the present invention, it is preferable that the first microporous layer coating liquid is applied to a surface of the electrically conductive porous substrate, and the surface microporous layer coating liquid is applied thereon in such a manner that the second microporous layer has a thickness of 10 µm or less. Here, a plurality of layers can be formed as the second microporous layer. For uniformly applying such thin films, it is effective to use a Wet-on-Wet layering technique in which the first microporous layer coating liquid is applied onto the electrically conductive porous substrate, followed by successively applying the surface microporous layer coating liquid without drying the applied first microporous layer coating liquid. A surface of the electrically conductive porous substrate is generally rough, and may have an irregularity difference of approximately 10 µm. Even when the first microporous layer coating liquid is applied to such a surface having sharp irregularities, the irregularities cannot be completely eliminated after drying. For the second microporous layer, a thin film having a thickness of 10 µm or less is suitable, and therefore it is preferable that the surface microporous layer coating liquid has a somewhat low viscosity. When a thin film is formed on a surface having irregularities as described above using such a low-viscosity coating liquid, thin films of the dense layer and the second microporous layer can be uniformly formed on the surface of the first microporous layer by superposing the first microporous layer coating liquid and the surface microporous layer coating liquid on each other before drying, and then performing drying at a time for suppressing a local increase in thickness due to accumulation of a liquid in recesses of the irregularities.

When in multilayer coating, drying is performed at a time after completion of multilayer coating rather than performing drying after application of each layer, only one dryer is necessary, and the coating process is shortened, resulting in saving of equipment costs and a production space. In addition, since the process is shortened, it is also possible to reduce loss of a generally expensive electrically conductive porous substrate in the process.

Examples of the method that can be employed in the multilayer coating include a method in which the first microporous layer coating liquid is applied with a die coater, and the surface microporous layer coating liquid is applied with a die coater; a method in which the first microporous layer coating liquid is applied with various kinds of roll coaters, and the surface microporous layer coating liquid is applied with a die coater; a method in which the first microporous layer coating liquid is applied with a roll knife coater, and the surface microporous layer coating liquid is applied with a die coater; a method in which the first microporous layer coating liquid is applied with a rip coater, and the surface microporous layer coating liquid is applied with a die coater; and a method in which the first microporous layer coating liquid and the surface microporous layer coating liquid are superposed on each other before the substrate is coated using a slide die coater. In particular, for uniformly applying a high-viscosity coating liquid, it is preferable that the first microporous layer coating liquid is applied with a die coater or a roll knife coater.

The coating methods in a die coater and a roll knife coater as described above are described in many existing documents such as "Comprehensive Text of Converting" (edited by Converting Technical Institute). The die coater employs a system in which a coating liquid measured beforehand is applied onto a substrate by passing through a die for uniformly distributing the coating liquid in a width direction. In addition, the roll knife coater employs a coating system in which as with a knife coater, a coating liquid thickly applied beforehand is scraped off by a roll knife set at a certain height, so that the coating surface is made smooth in spite of irregularities of a substrate.

In a preferred aspect of the present invention, first a thin film having a thickness of 1 µm or more and 10 µm or less is formed as uniformly as possible as a surface layer such as the second microporous layer. In addition, it is preferable that adhesion between the electrolyte membrane with a catalyst applied on both sides and the gas diffusion electrode (contact area between the surface of the catalyst layer and the surface of the microporous layer of the gas diffusion electrode) is increased as much as possible. For this purpose, it is preferable that the surface of the microporous layer of the gas diffusion electrode is made as smooth as possible. In addition, a method is generally known in which a catalyst ink is applied on the gas diffusion electrode side (GDE method). Here, it is preferable that the surface of the microporous layer of the gas diffusion electrode is made as smooth as possible for uniformly applying the catalyst ink. Thus, when smoothness is required, higher smoothness can be obtained by applying the first microporous layer coating liquid with a roll knife coater or the like to level off the roughness of the substrate, and then applying the surface microporous layer coating liquid with a die coater.

In the present invention, a surface roughness Ra is used as an index of smoothness. In the gas diffusion electrode of the present invention, the surface roughness of the microporous layer is preferably 6 µm or less. In the gas diffusion electrode of the present invention, the dense layer or second microporous layer is situated at the surface of the microporous layer. That is, the surface roughness Ra (arithmetic mean roughness) of the dense layer or second microporous layer situated at the surface of the microporous layer is preferably 6 µm or less. The surface roughness is more preferably 4 µm or less. When the surface roughness Ra is 6 µm or less, adhesion to the catalyst layer can be improved. In addition, when considering application of the catalyst ink to the surface of the microporous layer, the lower limit of the surface roughness Ra may be about 0.1 µm.

For measurement of the surface roughness, a various kinds of surface roughness meters can be used. Since the microporous layer is relatively fragile, it is preferable to use a noncontact-type measurement device. The noncontact-type measurement device is, for example, a laser microscope VX-100 from KEYENCE CORPORATION.

A production apparatus suitable for producing the gas diffusion electrode of the present invention includes an unwinding machine, a first coating machine, a second coating machine, a dryer and a winding machine. The unwinding machine is used for unwinding the long electrically conductive porous substrate wound in a roll form. The first coating machine is used for applying the first microporous layer coating liquid to the electrically conductive porous substrate unwound by the unwinding machine. The second coating machine is used for applying the surface microporous layer coating liquid to the electrically conductive porous substrate. Here, the electrically conductive porous substrate is coated with the first microporous layer coating liquid, and coated with the surface microporous layer coating liquid in a state in which the porous substrate is not substantially dried. The second coating machine is disposed on the same substrate surface side as the substrate surface side on which the first coating machine is disposed. In addition, the dryer is used for drying the electrically conductive porous substrate coated with the first microporous layer coating liquid and the surface microporous layer coating liquid. The winding machine is used for winding up the resulting gas diffusion electrode.

FIGS. 3 and 4 each illustrate an especially preferred production apparatus in the present invention.

In the production apparatus shown in FIG. 3, a long electrically conductive porous substrate 1 is unwound from an unwinding machine 2, and conveyed while being appropriately supported by a guide roll (non-driving) 3, and a first microporous layer coating liquid is applied to one surface of the electrically conductive porous substrate by a first die coater 4 as a first coating machine. Here, the first microporous layer coating liquid is normally supplied from a coating liquid tank 12 to the die coater by a liquid feeding pump 13. Preferably, the first microporous layer coating liquid is filtered by a filter 14. Drying is performed by a dryer 7, a surface microporous layer coating liquid is then applied onto the coating surface of the first microporous layer coating liquid by a second die coater 5 as a second coating machine, which is disposed on the same substrate surface side as the substrate surface side on which the first die coater 4 is disposed, and drying is then performed by the dryer 7. The gas diffusion electrode is wound up by a winding machine (driving) 9. The surface microporous layer coating liquid is also normally supplied from the coating liquid tank 12 to the die coater by the liquid feeding pump 13. Preferably, the surface microporous layer coating liquid is filtered by the filter 14. It is preferable that as shown in FIG. 3, a sintering machine 8 is installed after the dryer 7, and sintering is performed inline. In addition, in application of the microporous layer coating liquid by the die coater, a back roll 6 may be used, and in winding, an inserting paper 10 unwound from an unwinding machine (for inserting paper) 11 may be wound together with the product for protection of the coating surface.

In the production apparatus shown in FIG. 4, a roll knife coater 40 is installed in place of the first die coater 4 in FIG. 3. When coating is performed by the roll knife coater, a substrate is conveyed while a coating material is supplied to a liquid dam 42, and the coating material is scraped off by a knife roll 41 so that a desired coating amount is obtained.

In addition, at the time when a plurality of layers are provided on the substrate, the plurality of layers are dried at a time, so that the dryer can be simplified. In addition, since the process between unwinding and winding can be shortened, so that productivity can be enhanced, and even if the substrate is broken, loss can be kept low. For fuel cells or fuel cell vehicles to come into wide use, production of high-performance fuel cells at a low cost is absolutely necessary, and therefore cost reduction is required for all fuel cell members. Thus, cost reduction of the gas diffusion electrode is important.

A fuel cell of the present invention includes the gas diffusion electrode of the present invention. Since the fuel cell of the present invention includes the gas diffusion electrode of the present invention, a fuel cell exhibiting high power generation performance in a wide range from a high temperature to a low temperature can be provided. Thus, for example, the power of a fuel cell automobile is improved, and a long cruising distance can be attained due to a high driving force and reduction of a supplied fuel gas.

The fuel cell of the present invention can be obtained by, for example, a process in which to both sides of an electrolyte membrane with a catalyst layer provided on both surfaces thereof, the gas diffusion electrode is press-bonded so as to come into contact with the catalyst layer, and members such as a separator are incorporated to construct a single cell. Here, the cell may be constructed in such a manner that a second microporous layer is in contact with the catalyst layer.

The gas diffusion electrode of the present invention is suitably used for fuel cells, particularly for polymer electrolyte fuel cells to be used as power sources for fuel cell vehicles.

EXAMPLES

Hereinafter, the present invention will be described in detail by way of examples. The materials used in examples, the method for preparing an electrically conductive porous substrate, and the battery performance evaluation method for a fuel cell are described below.

<Materials>

A: Electrically Conductive Porous Substrate

A carbon paper having a thickness of 150 μm and a porosity of 85% was prepared in the following manner.

Polyacrylonitrile-based carbon fiber "TORAYCA" (registered trademark) T300-6K (mean diameter of monofilaments: 7 μm, number of monofilaments: 6,000) manufactured by Toray Industries, Inc. was cut at a length of 12 mm. Next, a papermaking process was carried out in which together with a pulp, the carbon fiber was subjected to papermaking continuously with water as a papermaking medium, immersed in a 10 mass % polyvinyl alcohol aqueous solution, and dried. The carbon fiber was then wound up in a roll form to obtain a long carbon fiber paper having a carbon short fiber areal weight of 15 g/m$^2$. The amount of the pulp added was 40 parts by mass, and the loading amount of polyvinyl alcohol was 20 parts by mass based on 100 parts by mass of the carbon fiber paper.

A dispersion liquid obtained by mixing scaly graphite (average particle diameter: 5 μm), phenol resin and methanol at a mass ratio of 5:10:85 was provided. A resin impregnation process was carried out in which the carbon fiber paper was continuously impregnated with the dispersion liquid in such a manner that the amount of a resin component (phenol resin+scaly graphite) was 130 parts by mass based on 100 parts by mass of carbon short fiber, and the carbon fiber paper was dried at a temperature of 100° C. for 5 minutes. The carbon fiber paper was then wound up in a roll form to obtain a resin-impregnated carbon fiber paper. As the phenol resin, one obtained by mixing a resol-type phenol resin and a novolac-type phenol resin at a mass ratio of 1:1 was used.

In a flat plate press machine, heat plates were set so as to be parallel to each other. The resin-impregnated carbon fiber paper was subjected to a compression treatment while heat was applied at 180° C. for 5 minutes.

A carbonization treatment was carried out in which as a precursor fiber sheet, the carbon fiber paper subjected to the compression treatment was introduced into a heating furnace kept in a nitrogen gas atmosphere, and was fired at a maximum temperature of 2400° C. The carbon fiber paper was then wound up in a roll form to obtain a carbon paper. The resulting carbon paper had a density of 0.25 g/cm$^3$ and a porosity of 85%.

A carbon paper having a thickness of 180 μm and a porosity of 85% was prepared in the same manner as in the case of the carbon paper having a thickness of 150 μm and a porosity of 85% except that the areal weight of the carbon fiber and the pressure in the compression treatment were adjusted so that the thickness after carbonization was 180 μm.

Further, the areal weight of the carbon fiber and the pressure in the compression treatment were adjusted to obtain a carbon paper having a thickness of 250 μm after carbonization.

B: Carbon Blacks (1 to 4)

Carbon black 1: primary particle diameter: 0.052 μm, DBP oil absorption: 140 cc/100 g, BET specific surface area: 41 m$^2$/g, structure index: 3.4

Carbon black 2: primary particle diameter: 0.045 μm, DBP oil absorption: 125 cc/100 g, BET specific surface area: 41 m$^2$/g, structure index: 3.0

Carbon black 3: primary particle diameter: 0.032 μm, DBP oil absorption: 175 cc/100 g, BET specific surface area: 67 m$^2$/g, structure index: 2.6

Carbon black 4: primary particle diameter: 0.035 μm, DBP oil absorption: 174 cc/100 g, BET specific surface area: 254 m$^2$/g, structure index: 0.69

C: Hydrophobic Agent

"NEOFLON" (registered trademark) FEP Dispersion ND-110 (FEP resin manufactured by DAIKIN INDUSTRIES, Ltd.)

D: Surfactant

"TRITON" (registered trademark) X-100 (manufactured by Nacalai Tesque, Inc.)

<Measurement of Thickness of Substrate and Microporous Layer>

The thickness of the substrate (the gas diffusion electrode and the electrically conductive porous substrate) was measured using a digital thickness meter "DIGIMICRO" manufactured by Nikon Corporation. The thickness was measured while a load of 0.15 MPa was applied to the substrate.

The thickness of the microporous layer was measured by subtracting the thickness of the electrically conductive porous substrate from the thickness of the gas diffusion electrode when the coating thickness was examined in application of the microporous layer coating liquid to the substrate. At this time, the thickness of the microporous layer infiltrated into the electrically conductive porous substrate was not included.

In addition, for evaluation of the thickness of each of the first microporous layer, the dense layer and the second microporous layer, a cross-section of the gas diffusion electrode in a thickness direction was prepared. An ion milling apparatus IM4000 manufactured by Hitachi High-Technologies Corporation was used in preparation of the cross-section of the gas diffusion electrode. The prepared cross-section was imaged and photographed at a magnification of 2000 times using a scanning electron microscope S-4800 manufactured by Hitachi, Ltd., and pores were analyzed using image analysis software "Image J". FIG. 6 shows a schematic view in which a luminance B of only the microporous layer in the cross-section image in the thickness direction is plotted on the abscissa, and a distribution of pixels (number of pixels) of the corresponding luminance is plotted on the ordinate. An inflection point 32 in the middle of a shoulder 33 on a side on which the luminance descended from a maximum point 31 was defined as a threshold in binarization, a portion having a luminance smaller than the threshold was defined as a pore, and the area was determined by particle analysis. As described above, gas diffusibility is improved when the pore diameter is 0.15 μm or more, and retention of water is suppressed to improve water removal performance when the pore diameter is 1 μm or less. Pores having an area corresponding to a pore diameter of 0.15 μm or more and 1 μm or less were extracted, and the average number density of the entire microporous layer and the number density in a thickness direction were determined to specify a dense layer. Subsequently, the microporous layer on the electrically conductive porous substrate side from the dense layer was specified as a first microporous layer, and the microporous layer on the surface side from the dense layer was specified as a second microporous layer. The thickness of each of the thus-specified first microporous layer, dense layer and second microporous layer was determined. One example thereof is shown in FIG. 7. A depth D [μm] from the surface was plotted on the abscissa, and a pore number density P [number of pores/μm$^2$] was plotted on the ordinate. The outermost surface of the microporous layer was approximated to a straight line, the line was defined as a surface 205 at a depth of 0 μm, and a depth in a direction perpendicular to the line was defined as a depth in a thickness direction. When the average value of pore number densities P is defined as an average number density A207 of pores of the microporous layer, a point showing the value of a pore number density P that is 1.3 times the average number density A207 corresponds to a value 206 at which the pore number density is 1.3A.

<Measurement of Primary Particle Diameter of Electrically Conductive Fine Particles>

The first microporous layer, the dense layer and the second microporous layer were taken out from the microporous layer of the gas diffusion electrode to be measured, and were heat-treated in air at 500° C. for 1 hour, electrically conductive fine particles contained in each of the layers were then observed at a magnification of 200000 times with an electron microscope, the diameters of randomly selected 100 primary particles were measured, and an average value thereof was determined, and defined as an average of the diameters of primary particles in each of the layers. When a plurality of peaks were present in a particle diameter distribution, it was considered that several kinds of electrically conductive fine particles were mixed, and each peak value was defined as the primary particle diameter of corresponding kind of electrically conductive fine particles.

<Measurement of Surface Roughness>

For the surface of the microporous layer of the gas diffusion electrode to be measured, roughness measurement was performed over a range of 5 mm square with no cutoff at an objective lens magnification of 10 times using a laser microscope VK-X100 manufactured by KEYENCE COR- PORATION, and an arithmetic mean roughness Ra was determined. This procedure was repeatedly carried out ten times while the measurement site was changed for each time, and the average value thereof was defined as a surface roughness value.

<Gas Diffusibility in Thickness Direction>

With a water vapor/gas permeation and diffusion evaluation apparatus (MVDP-200C) manufactured by Seika Corporation, a gas for which diffusibility is to be measured is fed to one surface side (primary side) of the gas diffusion electrode, and a nitrogen gas is fed to the other surface side (secondary side) of the gas diffusion electrode. Control was performed so that a pressure difference between the primary side and the secondary side was in the vicinity of 0 Pa (0±3 Pa) (i.e. the pressure difference hardly caused a gas flow, and only molecular diffusion caused a gas movement phenomenon), a gas concentration at the time of reaching equilibrium was measured by a gas concentration meter on the secondary side, and the value of the gas concentration (%) was defined as an index of gas diffusibility in a thickness direction.

<Gas Diffusibility in In-Plane Direction>

The water vapor gas water vapor permeation and diffusion evaluation apparatus (MVDP-200C) manufactured by Seika Corporation was used. In a pipe system as shown in FIG. 5, first only a valve A (303) was opened, and a valve B (305) was kept closed, so that a nitrogen gas 313 was fed to a primary-side pipe A (302). The system was adjusted so that a predetermined amount (190 cc/minute) of a gas was fed to a mass flow controller (301), and a gas pressure of 5 kPa was applied to a pressure controller (304) with respect to atmospheric pressure. A gas diffusion electrode sample (308) was set on a seal material (312) present between a gas chamber A (307) and a gas chamber B (309). Then, the valve A (303) was closed, and the valve B (305) was opened, so that the nitrogen gas was fed to a pipe B (306). The nitrogen gas fed into the gas chamber A (307) moved to the gas chamber B (309) through voids of the gas diffusion electrode sample (308), passed through a pipe C (310), and further passed through a gas flow meter (311) to be released into the air. The gas flow rate (cc/minute) fed through the gas flow meter (311) at this time was measured, and the measured value was defined as gas diffusibility in an in-plane direction.

<Measurement of Melting Point of Hydrophobic Agent>

The melting point of a hydrophobic agent in the microporous layer was measured by differential scanning calorimetry. Only the microporous layer was taken from the gas diffusion electrode by forceps. DSC 6220 manufactured by Seiko Instruments Inc. (SII) was used as an apparatus. The temperature was changed from 30° C. to 400° C. at a temperature elevation rate of 2° C./minute in nitrogen. The endothermic and exothermic peaks at that time were observed, and the endothermic peak at a temperature of 150° C. or more was defined as a melting point.

<Evaluation of Power Generation Performance>

The resulting gas diffusion electrode was disposed on both sides of an electrolyte membrane/catalyst integrated product (one obtained by forming a catalyst layer "PRIMEA" (registered trademark) manufactured by W. L. Gore & Associates, Inc. on both surfaces of an electrolyte membrane "GORE SELECT" (registered trademark) manufactured by W. L. Gore & Associates, Inc.) in such a manner that the catalyst layer and the microporous layer were in contact with each other, and hot pressing was performed with a pressure of 2 MPa for 20 minutes at 110° C. to prepare a membrane electrode assembly (MEA). The membrane electrode assembly was incorporated into a single cell for a fuel cell, the cell temperature, the fuel utilization efficiency and the air utilization efficiency were set to 40° C., 70% and 40%, respectively, hydrogen on the anode side and air on the cathode side were humidified so as to have dew points of 75° C. and 60° C., respectively, and the cell was caused to generate power. The current density was increased, and the current density value at which power generation was stopped (limit current density) was defined as an index of flooding resistance. In addition, similar measurement was performed at a cell temperature of 90° C., and the measured value was defined as an index of dry-out resistance. Further, power generation performance under normal operation conditions (cell temperature: 70° C.) was measured.

Example 1

A carbon paper wound in a roll form and having a thickness of 150 μm and a porosity of 85% was subjected to a hydrophobic treatment by immersing the carbon paper in an immersion bath filled with a hydrophobic agent dispersion obtained by dispersing a fluororesin in water in a concentration of 2% by mass while the carbon paper was conveyed using a winding-type conveyance apparatus. The carbon paper was dried by a dryer set at 100° C., and was wound up by a winding machine to obtain an electrically conductive porous substrate subjected to a hydrophobic treatment. As the hydrophobic agent dispersion, one obtained by diluting FEP Dispersion ND-110 by water so as to attain a FEP concentration of 2% by mass was used.

Next, a winding-type continuous coater was provided in which a conveyance apparatus including an unwinding machine 2, a guide roll (non-driving) 3, a back roll 6, a unwinding machine (for interlayer paper) 11 and a winding machine (driving) 9 was equipped with two die coaters: a first die coater 4 and a second die coater 5, a dryer 7 and a sintering machine 8 as schematically shown in FIG. 3.

As an electrically conductive porous substrate subjected to the hydrophobic treatment, a web in which a carbon paper having a thickness of 150 μm and a porosity of 85% was wound in a roll form was set in the unwinding machine 2.

The web was conveyed by driving rolls installed in an unwinding section, a winding section and a coater section. First, a first microporous layer coating liquid was applied using the first die coater 4, and a surface microporous layer coating liquid was then successively applied by the second die coater 5. In the dryer 7, water and moisture was removed by drying with hot air at 100° C. Further, the web was sintered for 10 minutes in the sintering machine 8 set at 350° C., and then wound up by the winding machine (driving) 9.

The microporous layer coating liquid was prepared in the following manner.

First microporous layer coating liquid:

parts by mass of carbon black 1, 5 parts by mass of FEP Dispersion ("NEOFLON" (registered trademark) ND-110), 15 parts by mass of a surfactant ("TRITON" (registered trademark) X-100) and 65 parts by mass of purified water were mixed and kneaded by a planetary mixer to prepare a coating liquid.

Surface microporous layer coating liquid:

5 parts by mass of carbon black 3, 2 parts by mass of FEP Dispersion ("NEOFLON" (registered trademark) ND-110), 7 parts by mass of a surfactant ("TRITON" (registered trademark) X-100) and 86 parts by mass of purified water were mixed and kneaded by a planetary mixer to prepare a coating liquid.

In application of the first microporous layer coating liquid, adjustment was made so that the areal weight of the microporous layer after sintering was 16 g/m². Here, the first microporous layer had a thickness of 22 μm. Further, in application of the surface microporous layer coating liquid, adjustment was made so that the dense layer had a thickness of 2 μm, and the second microporous layer had a thickness of 3 μm.

Results of the average number density of pores of the gas diffusion electrode prepared in the manner described above are shown in Table 1.

Two peaks were observed in the primary particle diameter of electrically conductive fine particles in the dense layer.

5 mg of the microporous layer was taken by forceps, and the melting point of the hydrophobic agent contained in the layer was measured. The result showed that the hydrophobic agent had a melting point of 310° C.

To both sides of an electrolyte membrane with a catalyst layer provided on both surfaces thereof, the gas diffusion electrode prepared as described above was thermally press-bonded in such a manner that the microporous layer and the catalyst layer were in contact with each other, and the resulting product was incorporated into a single cell for a fuel cell. Power generation performance (limit current density) was evaluated at each of temperatures of 40° C., 70° C. and 90° C.

The results are shown in Tables 1 to 5 including other physical property values.

Example 2

A gas diffusion electrode was prepared in the same manner as in Example 1 except that in Example 1, the carbon black contained in the first microporous layer coating liquid was changed to carbon black 2.

Example 3

A gas diffusion electrode was prepared in the same manner as in Example 1 except that in Example 1, the thickness of the carbon paper was changed to 120 μm.

Example 4

A gas diffusion electrode was prepared in the same manner as in Example 3 except that in Example 1, the carbon black contained in the first microporous layer coating liquid was changed to carbon black 2.

Example 5

A gas diffusion electrode was prepared in the same manner as in Example 1 except that in Example 1, the thickness of the carbon paper was changed to 180 μm.

Example 6

A gas diffusion electrode was prepared in the same manner as in Example 5 except that in Example 1, the carbon black contained in the first microporous layer coating liquid was changed to carbon black 2.

Example 7

A gas diffusion electrode was prepared in the same manner as in Example 1 except that in Example 1, a carbon paper having a porosity of 85% and a thickness of 250 μm was used as an electrically conductive porous substrate. The gas diffusion electrode was incorporated in a single cell for a fuel cell as in Example 1, and power generation performance was evaluated.

Example 8

A gas diffusion electrode was prepared in the same manner as in Example 7 except that in Example 1, the carbon black contained in the first microporous layer coating liquid was changed to carbon black 2.

Comparative Example 1

A gas diffusion electrode was prepared in the same manner as in Example 1 except that in Example 1, the carbon black in the first microporous layer coating liquid and the carbon black in the surface microporous layer coating liquid were changed to carbon black 3 and carbon black 4, respectively. The gas diffusion electrode was incorporated in a single cell for a fuel cell as in Example 1, and power generation performance was evaluated. In this example, the pore diameter of the microporous layer close to the surface was 0.15 μm or less, and it was not possible to confirm formation of a dense layer.

Comparative Example 2

A gas diffusion electrode was prepared in the same manner as in Example 1 except that in Example 1, the carbon black in the first microporous layer was changed to carbon black 4.

In this example, the pore diameter of the entire microporous layer was 0.15 μm or less, and it was not possible to confirm formation of a dense layer.

Example 9

A gas diffusion electrode was prepared in the same manner as in Example 1 except that in Example 1, the areal weight of the first microporous layer, the thickness of the first microporous layer, the thickness of the dense layer and the thickness of the second microporous layer were changed to 13 g/m², 18 μm, 4 μm and 6 μm, respectively.

Example 10

A gas diffusion electrode was prepared in the same manner as in Example 9 except that in Example 1, the carbon black contained in the first microporous layer coating liquid was changed to carbon black 2.

Example 11

A gas diffusion electrode was prepared in the same manner as in Example 1 except that in Example 1, the areal weight of the first microporous layer, the thickness of the first microporous layer, the thickness of the dense layer and the thickness of the second microporous layer were changed to 13 g/m², 18 μm, 4 μm and 11 μm, respectively.

Example 12

A gas diffusion electrode was prepared in the same manner as in Example 11 except that in Example 1, the carbon black contained in the first microporous layer coating liquid was changed to carbon black 2.

Example 13

A gas diffusion electrode was prepared in the same manner as in Example 1 except that in Example 1, the areal weight of the first microporous layer and the thickness of the first microporous layer were changed to 28 g/m² and 48 µm, respectively.

Example 14

A gas diffusion electrode was prepared in the same manner as in Example 13 except that in Example 1, the carbon black contained in the first microporous layer coating liquid was changed to carbon black 2.

Example 15

A gas diffusion electrode was prepared in the same manner as in Example 1 except that in Example 1, the first microporous layer coating liquid was diluted with water to be easily infiltrated into the electrically conductive porous substrate, and the areal weight of the microporous layer was then set to 20 g/m² so that the thickness was almost equal to that in Example 1.

Example 16

A gas diffusion electrode was prepared in the same manner as in Example 15 except that in Example 1, the carbon black contained in the first microporous layer coating liquid was changed to carbon black 2.

Example 17

A gas diffusion electrode was prepared in the same manner as in Example 1 except that in Example 1, the surface microporous layer coating liquid was applied twice.

Example 18

A gas diffusion electrode was prepared in the same manner as in Example 17 except that in Example 1, the carbon black contained in the first microporous layer coating liquid was changed to carbon black 2.

Example 19

A gas diffusion electrode was prepared in the same manner as in Example 1 except that in Example 1, the surface microporous layer coating liquid was applied four times.

Example 20

A gas diffusion electrode was prepared in the same manner as in Example 19 except that in Example 1, the carbon black contained in the first microporous layer coating liquid was changed to carbon black 2.

Example 21

A gas diffusion electrode was prepared in the same manner as in Example 1 except that in Example 1, the carbon black in the surface microporous layer coating liquid was changed to carbon black 1.

Example 22

A gas diffusion electrode was prepared in the same manner as in Example 21 except that in Example 1, the carbon black contained in the first microporous layer coating liquid was changed to carbon black 2. In the dense layer, two kinds of electrically conductive fine particles were mixed, but the number of peaks observed in the primary particle diameter was 1.

Example 23

A gas diffusion electrode was prepared in the same manner as in Example 1 except that in Example 1, the carbon black in the first microporous layer coating liquid was changed to carbon black 3.

Example 24

A gas diffusion electrode was prepared in the same manner as in Example 1 except that in Example 1, only the dense layer was formed by applying the surface microporous layer coating liquid in an amount that was half of that in Example for forming only the dense layer on the first microporous layer.

Example 25

A gas diffusion electrode was prepared in the same manner as in Example 24 except that in Example 1, the carbon black contained in the first macroporous layer coating liquid was changed to carbon black 2.

Example 26

In Example 1, the method for preparing an electrically conductive porous substrate was changed. First, a long fiber of polyacrylonitrile was subjected to a flameproofing treatment at a temperature of 200° C. for 10 minutes, a nonwoven fabric was prepared by a water flow entanglement treatment, and roll pressing was performed. The long fiber was introduced into a heating furnace at a temperature of 2000° C. to obtain an electrically conductive porous substrate composed of a baked carbon fiber of a 150 µm-thick nonwoven fabric. Further, carbon black 3 and FEP resin "NEOFLON" (registered trademark) FEP Dispersion ND-110 (FEP resin manufactured by DAIKIN INDUSTRIES, Ltd.) were dispersed at a solid content mass ratio of 1:1 in water with a dispersant to prepare an impregnation liquid. The electrically conductive porous substrate was impregnated with the impregnation liquid, and then heated in a heating furnace at a temperature of 380° C. for 10 minutes. As a result, a carbon sheet subjected to a hydrophobic treatment and bound with 5% by mass, in terms of a solid content, of a hydrophobic agent also serving as a binding material was obtained. A gas diffusion electrode was prepared in the same manner as in Example 1 after the process for forming the microporous layer.

Example 27

A gas diffusion electrode was prepared in the same manner as in Example 26 except that in Example 1, the carbon black contained in the first microporous layer coating liquid was changed to carbon black 2.

Example 28

A gas diffusion electrode was prepared in the same manner as in Example 1 except that the first microporous layer coating liquid in Example 1 was changed to one including 15 parts by mass of carbon black 1, 13 parts by mass of FEP Dispersion ("NEOFLON" (registered trademark) ND-110), 15 parts by mass of a surfactant ("TRITON" (registered trademark) X-100) and 65 parts by mass of purified water.

Example 29

A gas diffusion electrode was prepared in the same manner as in Example 28 except that in Example 1, the carbon black contained in the first microporous layer coating liquid was changed to carbon black 2.

Example 30

A gas diffusion electrode was prepared in the same manner as in Example 1 except that the first microporous layer coating liquid in Example 1 was changed to one including 15 parts by mass of carbon black 1, 20 parts by mass of FEP Dispersion ("NEOFLON" (registered trademark) ND-110), 15 parts by mass of a surfactant ("TRITON" (registered trademark) X-100) and 65 parts by mass of purified water. It is considered that as a result, since the addition amount of the hydrophobic agent was 100% or more, the hydrophobic agent filled pores, leading to reduction of gas diffusibility, and ingress of the hydrophobic agent as an insulating material between electrically conductive particles caused an increase in electric resistance, leading to deterioration of power generation performance.

Example 31

A gas diffusion electrode was prepared in the same manner as in Example 28 except that in Example 1, the carbon black contained in the first microporous layer coating liquid was changed to carbon black 2. It is considered that as a result, since the addition amount of the hydrophobic agent was 100% or more, the hydrophobic agent filled pores, leading to reduction of gas diffusibility, and ingress of the hydrophobic agent as an insulating material between electrically conductive particles caused an increase in electric resistance, leading to deterioration of power generation performance.

Example 32

A gas diffusion electrode was prepared in the same manner as in Example 1 except that the first microporous layer coating liquid in Example 1 was changed to one including 15 parts by mass of carbon black 1, 2 parts by mass of FEP Dispersion ("NEOFLON" (registered trademark) ND-110), 15 parts by mass of a surfactant ("TRITON" (registered trademark) X-100) and 65 parts by mass of purified water.

Example 33

A gas diffusion electrode was prepared in the same manner as in Example 28 except that in Example 1, the carbon black contained in the first microporous layer coating liquid was changed to carbon black 2.

Example 34

A gas diffusion electrode was prepared in the same manner as in Example 1 except that the first microporous layer coating liquid in Example 1 was changed to one including 15 parts by mass of carbon black 1, 5 parts by mass of PTFE Dispersion ("POLYFLON" (registered trademark) D-210C), 15 parts by mass of a surfactant ("TRITON" (registered trademark) X-100) and 65 parts by mass of purified water. 5 mg of the microporous layer was taken by forceps, and the melting point of the hydrophobic agent contained in the layer was measured. The result showed that the hydrophobic agent had a melting point of 330° C. Thus, it is considered that during sintering, spreading of the resin is small, so that hydrophobicity is reduced, resulting in deterioration of water removal performance. Thus, as compared to Example 1, power generation performance at a low temperature of 40° C. was deteriorated, and power generation performance at a high temperature of 80° C. was improved.

Example 35

A gas diffusion electrode was prepared in the same manner as in Example 30 except that in Example 1, the carbon black contained in the first microporous layer coating liquid was changed to carbon black 2. The gas diffusion electrode had the same tendency of change in power generation performance as in Example 34.

Comparative Example 3

A gas diffusion electrode was prepared in the same manner as in Example 1 except that in Example 1, the first microporous layer was not formed, the surface microporous layer coating liquid was applied four times to form a 10 μm-thick dense layer, and a 15 μm-thick second microporous layer was then formed.

TABLE 1

| | | Unit | Example 1 | Example 2 | Example 3 | Example 4 | Example 5 | Example 6 | Example 7 | Example 8 |
|---|---|---|---|---|---|---|---|---|---|---|
| Electrically conductive porous substrate | Thickness | μm | 150 | 150 | 120 | 120 | 180 | 180 | 250 | 250 |
| | Porosity | % | 85 | 85 | 85 | 85 | 85 | 85 | 85 | 85 |
| First microporous layer | Thickness | μm | 23 | 23 | 23 | 23 | 23 | 23 | 23 | 23 |
| | Areal weight | g/m$^2$ | 16 | 16 | 16 | 16 | 16 | 16 | 16 | 16 |
| | Average number density of pores having a pore diameter of 0.15 μm or more and 1 μm or less | number/μm$^2$ | 1.34 | 1.32 | 1.35 | 1.33 | 1.46 | 1.42 | 1.38 | 1.35 |
| | Average number density of pores having a pore diameter of 1 μm or more | number/μm$^2$ | 0.12 | 0.12 | 0.11 | 0.11 | 0.11 | 0.11 | 0.12 | 0.12 |
| | Primary particle diameter of electrically conductive fine particles | nm | 51 | 43 | 50 | 42 | 51 | 44 | 52 | 43 |

TABLE 1-continued

|  |  | Unit | Example 1 | Example 2 | Example 3 | Example 4 | Example 5 | Example 6 | Example 7 | Example 8 |
|---|---|---|---|---|---|---|---|---|---|---|
| Dense layer | Thickness | μm | 2 | 2 | 2 | 2 | 2 | 2 | 2 | 2 |
|  | Average number density B of pores having a pore diameter of 0.15 μm or more and 1 μm or less | number/μm$^2$ | 2.74 | 2.66 | 2.65 | 2.57 | 2.55 | 2.30 | 2.56 | 2.44 |
|  | Average number density B/average number density A |  | 1.92 | 1.89 | 1.86 | 1.83 | 1.68 | 1.62 | 1.75 | 1.71 |
|  | Average number density B/average number density C |  | 2.21 | 2.15 | 2.15 | 2.09 | 1.96 | 1.84 | 1.92 | 1.83 |
|  | Primary particle diameter of electrically conductive fine particles | nm | 50/33 | 45/33 | 51/33 | 41/33 | 50/31 | 43/34 | 51/35 | 42/33 |
| Second microporous layer | Thickness | μm | 3 | 3 | 3 | 3 | 3 | 3 | 3 | 3 |
|  | Average number density C of pores having a pore diameter of 0.15 μm or more and 1 μm or less | number/μm$^2$ | 1.24 | 1.24 | 1.23 | 1.23 | 1.30 | 1.30 | 1.33 | 1.33 |
|  | Primary particle diameter of electrically conductive fine particles | nm | 32 | 32 | 33 | 32 | 34 | 35 | 35 | 32 |
| Gas diffusion electrode | Average number density A of pores having a pore diameter of 0.15 μm or more and 1 μm or less | number/μm$^2$ | 1.43 | 1.41 | 1.43 | 1.41 | 1.52 | 1.48 | 1.46 | 1.43 |
|  | Total thickness of microporous layer | μm | 28 | 28 | 28 | 28 | 28 | 28 | 28 | 28 |
|  | Gas diffusibility in thickness direction | % | 32 | 32 | 33 | 33 | 30 | 30 | 29 | 29 |
|  | Gas diffusibility in in-plane direction | cc/minute | 102 | 100 | 86 | 86 | 115 | 113 | 141 | 136 |
|  | Surface roughness of microporous layer | μm | 3.9 | 3.8 | 4.0 | 4.0 | 4.3 | 4.4 | 5.6 | 5.7 |
|  | Power generation performance (840° C.) | A/cm$^2$ | 1.74 | 1.72 | 1.82 | 1.8 | 1.51 | 1.47 | 1.55 | 1.53 |
|  | Power generation performance (870° C.) | A/cm$^2$ | 2.48 | 2.45 | 2.65 | 2.61 | 2.39 | 2.36 | 2.34 | 2.31 |
|  | Power generation performance (890° C.) | A/cm$^2$ | 1.67 | 1.62 | 1.67 | 1.65 | 1.65 | 1.60 | 1.55 | 1.93 |

TABLE 2

|  |  | Unit | Example 9 | Example 10 | Example 11 | Example 12 | Example 13 | Example 14 | Example 15 | Example 16 |
|---|---|---|---|---|---|---|---|---|---|---|
| Electrically conductive porous substrate | Thickness | μm | 150 | 150 | 150 | 150 | 150 | 150 | 150 | 150 |
|  | Porosity | % | 85 | 85 | 85 | 85 | 85 | 85 | 85 | 85 |
| First microporous layer | Thickness | μm | 18 | 18 | 18 | 18 | 48 | 48 | 22 | 22 |
|  | Areal weight | g/m$^2$ | 13 | 13 | 13 | 13 | 28 | 28 | 20 | 20 |
|  | Average number density of pores having a pore diameter of 0.15 μm or more and 1 μm or less | number/μm$^2$ | 1.45 | 1.41 | 1.47 | 1.45 | 1.46 | 1.44 | 1.49 | 1.47 |
|  | Average number density of pores having a pore diameter of 1 μm or more | number/μm$^2$ | 0.12 | 0.12 | 0.11 | 0.11 | 0.11 | 0.11 | 0.07 | 0.07 |
|  | Primary particle diameter of electrically conductive fine particles | nm | 53 | 44 | 51 | 44 | 51 | 43 | 50 | 43 |
| Dense layer | Thickness | μm | 4 | 4 | 4 | 4 | 2 | 2 | 2 | 2 |
|  | Average number density B of pores having a pore diameter of 0.15 μm or more and 1 μm or less | number/μm$^2$ | 2.57 | 2.41 | 2.37 | 2.35 | 2.51 | 2.48 | 2.64 | 2.56 |
|  | Average number density B/average number density A |  | 1.65 | 1.54 | 1.57 | 1.57 | 1.69 | 1.69 | 1.70 | 1.68 |
|  | Average number density B/average number density C |  | 2.07 | 1.94 | 1.88 | 1.87 | 2.04 | 2.02 | 2.11 | 2.05 |
|  | Primary particle diameter of electrically conductive fine particles | nm | 52/34 | 42/33 | 52/34 | 43/34 | 50/33 | 43/34 | 50/35 | 43/33 |
| Second microporous layer | Thickness | μm | 7 | 7 | 11 | 11 | 3 | 3 | 3 | 3 |
|  | Average number density C of pores having a pore diameter of 0.15 μm or more and 1 μm or less | number/μm$^2$ | 1.24 | 1.24 | 1.26 | 1.26 | 1.23 | 1.23 | 1.25 | 1.25 |
|  | Primary particle diameter of electrically conductive fine particles | nm | 32 | 33 | 34 | 35 | 33 | 34 | 34 | 34 |
| Gas diffusion electrode | Average number density A of pores having a pore diameter of 0.15 μm or more and 1 μm or less | number/μm$^2$ | 1.55 | 1.56 | 1.51 | 1.50 | 1.49 | 1.47 | 1.55 | 1.53 |
|  | Total thickness of microporous layer | μm | 29 | 29 | 33 | 33 | 53 | 53 | 27 | 27 |
|  | Gas diffusibility in thickness direction | % | 31 | 31 | 30 | 30 | 29 | 29 | 29 | 29 |
|  | Gas diffusibility in in-plane direction | cc/minute | 94 | 92 | 89 | 85 | 66 | 64 | 45 | 44 |
|  | Surface roughness of microporous layer | μm | 4.2 | 4.3 | 4.3 | 4.4 | 3.8 | 3.9 | 6.0 | 6.1 |
|  | Power generation performance (840° C.) | A/cm$^2$ | 1.61 | 1.68 | 1.38 | 1.32 | 1.40 | 1.37 | 1.41 | 1.37 |
|  | Power generation performance (870° C.) | A/cm$^2$ | 2.35 | 2.30 | 2.36 | 2.31 | 2.31 | 2.25 | 2.32 | 2.29 |
|  | Power generation performance (890° C.) | A/cm$^2$ | 1.72 | 1.69 | 1.76 | 1.75 | 1.71 | 1.68 | 1.75 | 1.73 |

TABLE 3

|  |  | Unit | Example 17 | Example 18 | Example 19 | Example 20 | Example 21 | Example 22 | Example 23 | Example 24 |
|---|---|---|---|---|---|---|---|---|---|---|
| Electrically conductive porous substrate | Thickness | μm | 150 | 150 | 150 | 150 | 150 | 150 | 150 | 150 |
|  | Porosity | % | 85 | 85 | 85 | 85 | 85 | 85 | 85 | 85 |
| First microporous layer | Thickness | μm | 22 | 22 | 22 | 22 | 22 | 22 | 22 | 22 |
|  | Areal weight | g/m$^2$ | 16 | 16 | 16 | 16 | 16 | 16 | 16 | 16 |
|  | Average number density of pores having a pore diameter of 0.15 μm or more and 1 μm or less | number/μm$^2$ | 1.28 | 1.25 | 1.28 | 1.24 | 1.33 | 1.29 | 3.55 | 1.37 |
|  | Average number density of pores having a pore diameter of 1 μm or more | number/μm$^2$ | 0.12 | 0.12 | 0.12 | 0.12 | 0.11 | 0.11 | 0.12 | 0.12 |
|  | Primary particle diameter of electrically conductive fine particles | nm | 51 | 42 | 52 | 44 | 51 | 43 | 30 | 51 |
| Dense layer | Thickness | μm | 8 | 8 | 12 | 12 | 2 | 2 | 2 | 2 |
|  | Average number density B of pores having a pore diameter of 0.15 μm or more and 1 μm or less | number/μm$^2$ | 2.72 | 2.60 | 2.68 | 2.52 | 2.46 | 2.30 | 4.87 | 2.66 |
|  | Average number density B/average number density A |  | 1.68 | 1.65 | 1.55 | 1.52 | 1.72 | 1.66 | 1.33 | 1.80 |
|  | Average number density B/average number density C |  | 2.23 | 2.13 | 2.13 | 2.00 | 1.68 | 1.59 | 1.29 | — |
|  | Primary particle diameter of electrically conductive fine particles | nm | 50/34 | 42/34 | 51/33 | 43/33 | 51 | 47 | 31 | 51 |
| Second microporous layer | Thickness | μm | 3 | 3 | 3 | 3 | 3 | 3 | 3 | — |
|  | Average number density C of pores having a pore diameter of 0.15 μm or more and 1 μm or less | number/μm$^2$ | 1.22 | 1.22 | 1.26 | 1.26 | 1.46 | 1.45 | 3.78 | — |
|  | Primary particle diameter of electrically conductive fine particles | nm | 32 | 34 | 32 | 33 | 52 | 51 | 31 | — |
| Gas diffusion electrode | Average number density A of pores having a pore diameter of 0.15 μm or more and 1 μm or less | number/μm$^2$ | 1.62 | 1.57 | 1.73 | 1.66 | 1.43 | 1.38 | 3.67 | 1.4775 |
|  | Total thickness of microporous layer | μm | 33 | 33 | 37 | 37 | 27 | 27 | 27 | 24 |
|  | Gas diffusibility in thickness direction | % | 31 | 31 | 31 | 31 | 32 | 32 | 30 | 32 |
|  | Gas diffusibility in in-plane direction | cc/minute | 102 | 101 | 102 | 100 | 102 | 100 | 68 | 102 |
|  | Surface roughness of microporous layer | μm | 3.9 | 4.2 | 3.9 | 4.0 | 3.9 | 4.1 | 6.2 | 2.8 |
|  | Power generation performance (840° C.) | A/cm$^2$ | 1.69 | 1.67 | 1.55 | 1.53 | 1.65 | 1.63 | 1.37 | 1.45 |
|  | Power generation performance (870° C.) | A/cm$^2$ | 2.39 | 2.38 | 2.40 | 2.37 | 2.42 | 2.40 | 2.35 | 2.34 |
|  | Power generation performance (890° C.) | A/cm$^2$ | 1.67 | 1.68 | 1.70 | 1.68 | 1.65 | 1.64 | 1.56 | 1.67 |

TABLE 4

|  |  | Unit | Example 25 | Example 26 | Example 27 | Example 28 | Example 29 | Example 30 | Example 31 | Example 32 |
|---|---|---|---|---|---|---|---|---|---|---|
| Electrically conductive porous substrate | Thickness | μm | 150 | 150 | 150 | 150 | 150 | 150 | 150 | 150 |
|  | Porosity | % | 85 | 83 | 83 | 85 | 84 | 85 | 86 | 85 |
| First microporous layer | Thickness | μm | 22 | 22 | 22 | 23 | 23 | 23 | 23 | 23 |
|  | Areal weight | g/m$^2$ | 16 | 16 | 16 | 16 | 16 | 16 | 16 | 16 |
|  | Average number density of pores having a pore diameter of 0.15 μm or more and 1 μm or less | number/μm$^2$ | 1.35 | 1.38 | 1.36 | 1.56 | 1.34 | 1.32 | 1.1 | 1.33 |
|  | Average number density of pores having a pore diameter of 1 μm or more | number/μm$^2$ | 0.12 | 0.12 | 0.12 | 0.12 | 0.12 | 0.12 | 0.12 | 0.12 |
|  | Primary particle diameter of electrically conductive fine particles | nm | 44 | 50 | 43 | 51 | 43 | 50 | 43 | 51 |
| Dense layer | Thickness | μm | 2 | 2 | 2 | 2 | 2 | 2 | 2 | 2 |
|  | Average number density B of pores having a pore diameter of 0.15 μm or more and 1 μm or less | number/μm$^2$ | 2.58 | 2.68 | 2.60 | 2.73 | 1.85 | 2.06 | 1.31 | 2.78 |
|  | Average number density B/average number density A |  | 1.78 | 1.83 | 1.80 | 1.70 | 1.35 | 1.51 | 1.16 | 1.96 |
|  | Average number density B/average number density C |  | — | 2.13 | 2.06 | 2.20 | 1.49 | 1.63 | 1.04 | 2.32 |
|  | Primary particle diameter of electrically conductive fine particles | nm | 42 | 50/33 | 42/33 | 50/33 | 45/33 | 50/33 | 45/33 | 50/33 |
| Second microporous layer | Thickness | μm | — | 3 | 3 | 3 | 3 | 3 | 3 | 3 |
|  | Average number density C of pores having a pore diameter of 0.15 μm or more and 1 μm or less | number/μm$^2$ | — | 1.26 | 1.26 | 1.24 | 1.24 | 1.26 | 1.26 | 1.20 |

TABLE 4-continued

|  |  | Unit | Example 25 | Example 26 | Example 27 | Example 28 | Example 29 | Example 30 | Example 31 | Example 32 |
|---|---|---|---|---|---|---|---|---|---|---|
| Gas diffusion electrode | Primary particle diameter of electrically conductive fine particles | nm | — | 32 | 32 | 32 | 32 | 32 | 32 | 32 |
|  | Average number density A of pores having a pore diameter of 0.15 μm or more and 1 μm or less | number/μm² | 1.4525 | 1.46 | 1.44 | 1.61 | 1.37 | 1.37 | 1.13 | 1.42 |
|  | Total thickness of microporous layer | μm | 24 | 27 | 27 | 28 | 28 | 28 | 28 | 28 |
|  | Gas diffusibility in thickness direction | % | 32 | 32 | 32 | 32 | 32 | 32 | 32 | 32 |
|  | Gas diffusibility in in-plane direction | cc/minute | 102 | 81 | 79 | 102 | 100 | 102 | 100 | 102 |
|  | Surface roughness of microporous layer | μm | 2.8 | 4.8 | 5.0 | 3.9 | 3.8 | 3.9 | 3.8 | 3.9 |
|  | Power generation performance (840° C.) | A/cm² | 1.42 | 1.65 | 1.63 | 1.72 | 1.72 | 1.45 | 1.38 | 1.72 |
|  | Power generation performance (870° C.) | A/cm² | 2.33 | 2.35 | 2.31 | 2.52 | 2.45 | 2.32 | 2.28 | 2.49 |
|  | Power generation performance (890° C.) | A/cm² | 1.66 | 1.65 | 1.64 | 1.72 | 1.71 | 1.60 | 1.58 | 1.66 |

TABLE 5

|  |  | Unit | Example 33 | Example 34 | Example 35 | Comparative Example 1 | Comparative Example 2 | Comparative Example 3 |
|---|---|---|---|---|---|---|---|---|
| Electrically conductive porous substrate | Thickness | μm | 150 | 150 | 150 | 150 | 150 | 150 |
|  | Porosity | % | 85 | 85 | 86 | 85 | 85 | 85 |
| First microporous layer | Thickness | μm | 23 | 23 | 23 | 28 | 28 | — |
|  | Areal weight | g/m² | 16 | 16 | 16 | 16 | 20 | — |
|  | Average number density of pores having a pore diameter of 0.15 μm or more and 1 μm or less | number/μm² | 1.32 | 1.42 | 1.28 | 1.36 | 3.58 | — |
|  | Average number density of pores having a pore diameter of 1 μm or more | number/μm² | 0.12 | 0.12 | 0.12 | 0.11 | 0.01 | — |
|  | Primary particle diameter of electrically conductive fine particles | nm | 43 | 50 | 43 | 48 | 35 | — |
| Dense layer | Thickness | μm | 2 | 2 | 2 | — | — | 10 |
|  | Average number density B of pores having a pore diameter of 0.15 μm or more and 1 μm or less | number/μm² | 2.74 | 2.75 | 2.19 | — | — | 2.25 |
|  | Average number density B/average number density A |  | 1.95 | 1.84 | 1.63 | — | — | 1.51 |
|  | Average number density B/average number density C |  | 2.32 | 2.18 | 1.74 | — | — | 1.76 |
|  | Primary particle diameter of electrically conductive fine particles | nm | 45/33 | 50/33 | 45/33 | — | — | 35 |
| Second microporous layer | Thickness | μm | 3 | 3 | 3 | — | — | 18 |
|  | Average number density C of pores having a pore diameter of 0.15 μm or more and 1 μm or less | number/μm² | 1.18 | 1.26 | 1.26 | — | — | 1.28 |
|  | Primary particle diameter of electrically conductive fine particles | nm | 32 | 32 | 32 | — | — | 35 |
| Gas diffusion electrode | Average number density A of pores having a pore diameter of 0.15 μm or more and 1 μm or less | number/μm² | 1.41 | 1.50 | 1.34 | 1.36 | 3.58 | 1.49 |
|  | Total thickness of microporous layer | μm | 28 | 28 | 28 | 28 | 28 | 28 |
|  | Gas diffusibility in thickness direction | % | 32 | 32 | 32 | 29 | 27 | 28 |
|  | Gas diffusibility in in-plane direction | cc/minute | 100 | 102 | 100 | 85 | 55 | 42 |
|  | Surface roughness of microporous layer | μm | 3.8 | 3.9 | 3.8 | 7.2 | 7.8 | 6.3 |
|  | Power generation performance (840° C.) | A/cm² | 1.68 | 1.63 | 1.61 | 1.22 | 1.19 | 1.02 |
|  | Power generation performance (870° C.) | A/cm² | 2.46 | 2.38 | 2.36 | 2.31 | 2.22 | 1.87 |
|  | Power generation performance (890° C.) | A/cm² | 1.61 | 1.72 | 1.70 | 1.55 | 1.43 | 1.45 |

DESCRIPTION OF REFERENCE SIGNS

1: Electrically conductive porous substrate
2: Unwinding machine
3: Guide roll (non-driving)
4: First die coater
5: Second die coater
6: Back roll
7: Dryer
8: Sintering machine
9: Winding machine (driving)
10: Inserting paper
11: Unwinding machine (for inserting paper)
12: Coating liquid tank
13: Liquid feeding pump
14: Filter
21: Thickness of dense layer
22: Thickness of first microporous layer
23: Thickness of second microporous layer
24: Thickness of electrically conductive porous substrate
31: Maximum point
32: Inflection point
33: Shoulder
40: Roll knife coater
41: Knife roll
42: Liquid dam
201: First microporous layer
202: Dense layer
203: Second microporous layer
204: Infiltration of microporous layer into electrically conductive porous substrate 205: Surface
206: Value at which pore diameter density is 1.3A
207: Average number density A of pores of microporous layer
301: Mass flow controller
302: Pipe A
303: Valve A
304: Pressure controller
305: Valve B
306: Pipe B
307: Gas chamber A
308: Gas diffusion electrode sample
309: Gas chamber B
310: Pipe C
311: Gas flow meter
312: Seal material
313: Nitrogen gas

The invention claimed is:

1. A gas diffusion electrode comprising a microporous layer on at least one surface of an electrically conductive porous substrate, wherein
the microporous layer includes a first microporous layer that is in contact with the electrically conductive porous substrate, and a dense layer that is in contact with the first microporous layer, the dense layer having a thickness of 1 μm or more, and
an average number density B of pores having a pore diameter of 0.15 μm or more and 1 μm or less in the dense layer is 1.3A or more where A is an average number density of pores having a pore diameter of 0.15 μm or more and 1 μm or less in the microporous layer disposed on at least one surface of the electrically conductive porous substrate.

2. The gas diffusion electrode according to claim 1, wherein the microporous layer includes a second microporous layer that is in contact with the surface of the dense layer.

3. The gas diffusion electrode according to claim 2, wherein the average number density B of pores having a pore diameter of 0.15 μm or more and 1 μm or less is 1.3C or more where C is an average number density of pores having a pore diameter of 0.15 μm or more and 1 μm or less in the second microporous layer.

4. The gas diffusion electrode according to claim 2, wherein the dense layer has a thickness of 1 μm or more and 10 μm or less, and the second microporous layer has a thickness of 1 μm or more and 10 μm or less.

5. The gas diffusion electrode according to claim 2, wherein the first microporous layer contains electrically conductive fine particles having a primary particle diameter of 0.040 μm or more and 0.060 μm or less, and the second microporous layer contains electrically conductive fine particles having a primary particle diameter of 0.015 μm or more and 0.040 μm or less.

6. The gas diffusion electrode according to claim 1, wherein the dense layer contains electrically conductive fine particles having a primary particle diameter of 0.040 μm or more and 0.060 μm or less, and electrically conductive fine particles having a primary particle diameter of 0.015 μm or more and 0.040 μm or less.

7. The gas diffusion electrode according to claim 1, wherein the microporous layer contains a hydrophobic agent, and the hydrophobic agent has a melting point of 200° C. or higher and 320° C. or lower.

8. The gas diffusion electrode according to claim 1, wherein the gas diffusion electrode has a gas diffusibility of 30% or more in a thickness direction.

9. The gas diffusion electrode according to claim 1, wherein the gas diffusion electrode has a gas diffusibility of 25 cc/minute or more in an in-plane direction.

10. The gas diffusion electrode according to claim 1, wherein the microporous layer has a surface roughness of 6 μm or less.

11. A fuel cell comprising the gas diffusion electrode according to claim 1.

* * * * *